US011693390B2

(12) United States Patent
Elber et al.

(10) Patent No.: US 11,693,390 B2
(45) Date of Patent: Jul. 4, 2023

(54) SYSTEMS AND METHODS FOR GENERATION OF A TRUSS

(71) Applicants: Technion Research & Development Foundation Limited, Haifa (IL); BCAM—Basque Center for Applied Mathematics, Bilbao (ES)

(72) Inventors: Gershon Elber, Haifa (IL); Boris Van Sosin, Haifa (IL); Daniil Rodin, Haifa (IL); Michael Barton, Bilbao (ES); Hanna Sliusarenko, Bilbao (ES)

(73) Assignees: Technion Research & Development Foundation Limited, Haifa (IL); BCAM—Basque Center for Applied Mathematics, Bilbao (ES)

( * ) Notice: Subject to any disclaimer, the term of this patent is extended or adjusted under 35 U.S.C. 154(b) by 68 days.

(21) Appl. No.: 17/313,209

(22) Filed: May 6, 2021

(65) Prior Publication Data
US 2021/0349441 A1  Nov. 11, 2021

Related U.S. Application Data

(60) Provisional application No. 63/021,163, filed on May 7, 2020.

(51) Int. Cl.
*G05B 19/4099*  (2006.01)

(52) U.S. Cl.
CPC ........... *G05B 19/4099* (2013.01); *G05B 2219/35134* (2013.01); *G05B 2219/45211* (2013.01)

(58) Field of Classification Search
CPC ...... G05B 19/4099; G05B 2219/35134; G05B 2219/45211; Y02P 90/02
(Continued)

(56) References Cited

U.S. PATENT DOCUMENTS

2006/0050987 A1* 3/2006 Shimada ............... G06T 17/20
                                                                            382/285
2014/0081603 A1* 3/2014 Griffith ................ G06F 30/20
                                                                            703/1
(Continued)

FOREIGN PATENT DOCUMENTS

CA    3053065 A1 * 2/2021 ........... A63H 33/107
CN  208586799 U  * 3/2019 ............ E04B 1/342
(Continued)

OTHER PUBLICATIONS

Fady Massarwi, et. al., "A B-spline based framework for volumetric object modeling", Computer-Aided Design 78 (2016) 36-47 (Year: 2016).*
(Continued)

*Primary Examiner* — Thomas C Lee
*Assistant Examiner* — Michael Tang

(57) ABSTRACT

There is provided a computer implemented method of manufacturing a truss of a three dimensional (3D) object representation, comprising: receiving a definition of the 3D object representation, arranging within an interior space of the 3D object representation, a plurality of instances of a sphere having a common radius to create a packed sphere arrangement, computing nodes of a truss for the 3D object representation, each respective node positioned at a center of each respective instance of each sphere of the packed sphere arrangement, computing beams of the truss by connecting adjacent nodes with respective beams, and providing code instructions for execution by a manufacturing device controller of a manufacturing device for manufacturing the truss.

23 Claims, 37 Drawing Sheets

(58) Field of Classification Search
USPC .......................................................... 700/98
See application file for complete search history.

(56) References Cited

U.S. PATENT DOCUMENTS

2016/0325505 A1* 11/2016 Ou ........................ B29C 64/393
2019/0033829 A1* 1/2019 Ulichney ............... H04N 1/405

FOREIGN PATENT DOCUMENTS

| CN | 109848410 A | * | 6/2019 | |
|----|-------------|---|--------|----|
| WO | WO-2018022035 A1 | * | 2/2018 | ........... B29C 64/171 |
| WO | WO-2018117971 A1 | * | 6/2018 | ............... B32B 5/14 |
| WO | WO-2019156947 A1 | * | 8/2019 | ............. B33Y 50/00 |

OTHER PUBLICATIONS

Kenji Shimada, et. al., "Bubble mesh: automated triangular meshing of non-manifold geometry by sphere packing", SMA '95: Proceedings of the third ACM symposium on Solid modeling and applications Dec. 1995 pp. 409-419 (Year: 1995).*

Y. Stoyan, et. al., "Packing congruent spheres into a multi-connected polyhedral domain", Intl. Trans. in Op. Res. 20 (2013) 79-99 (Year: 2013).*

Jianfei Liu, et. al., "A fast and practical method to pack spheres for mesh generation", Acta Mech Sin (2008) 24:439-447 (Year: 2008).*

S.X. Li, et al., "Computer Simulation of Random Sphere Packing in an Arbitrarily Shaped Container", CMC, vol. 7, No. 2, pp. 109-118, 2008 (Year: 2008).*

* cited by examiner

Input:
$D$: The domain in $\mathbb{R}^3$ to be filled with spheres;
$D_E$: The exterior neighborhood of $D$ with the offset distance $\varepsilon$;
$D_{tot} := D \cup D_E$;
$r$: The sphere radius;
Output:
The best valid configuration of spheres achieved after multiple application of the "Rigid Body Motion";
Algorithm:
1: $C := GenerateValidHoneycomb(D_{tot}, r)$;
2: for $i = 1$ to N do
3:    for all $x_i \in C$ do
4:       $C_{int} := GetInternalSpheres(C, r)$;
5:       $C_{ext} := C \setminus C_{int}$;
6:       $C_{intCl} := FindClosestToBoundary(C_{int}, \partial D)$;
7:       $C_{extCl} := FindClosestToBoundary(C_{ext}, \partial D)$;
8:    end for
9:    $M := GetOptHelicalMotion(C_{intCl}, C_{extCl}, D, r)$; // Alg. 2.
10:   $C_{new} := MoveSpheres(C, M)$;
11: end for
12: return $C_{new}$;

← 600

Input:
$D$: The domain in $\mathbb{R}^3$ to be filled with spheres;
$r$: The sphere radius;
$C$: The configuration of the internal spheres;
$C_{extCl}$: The configuration of the closest to $\partial D$ external spheres;
Output:
The configuration of spheres after applying a screw motion;
Algorithm:
1: $(\mathbf{c}, \bar{c}) :=$ the screw coordinates, see Eqs.(1) – (4)
2: $G :=$ the axis of the helical motion, see Eq.(5);
3: for all $x_i \in C \cup C_{extCl}$ do
4:    Rotate $x_i$ around $G$ by $\alpha = \arctan \|\mathbf{c}\|$;
5:    Translate $x_i$ parallel to $G$ by a distance $\frac{\mathbf{c} \cdot \bar{c}}{\|\mathbf{c}\|} \alpha$;
6: end for
7: $C := SpheresTranslated(D, r)$;
8: return $C$;

Input:
$D$: The domain in $\mathbb{R}^3$ to be filled with spheres;
$r$: The sphere radius;
$MaxNumRep$: The maximum number of repulsions allowed within an attempt (see Algorithm 4)
Output:
The best valid configuration of spheres achieved after multiple attempts;
Algorithm:
1: $C_{best} := GenerateValidHoneycombFill(D, r)$; // Alg. 1
2: while not $Satisfied()$ do
3:    $C_{new} := SP1RunAttempt(|C_{best}| + 1, D, r, MaxNumRep)$; // Alg.4
4:    if $IsValid(C_{new}, D, r)$ then
5:      $C_{best} := C_{new}$;
6:    end if
7: end while
8: return $C_{best}$;

FIG. 7

Input:
$N$: The number of spheres to try to fit into $D$ on this attempt;
$D$: The domain in $\mathbb{R}^3$ to be filled with spheres;
$r$: The sphere radius;
*MaxNumRep*: The maximum number of repulsions allowed within an attempt;
Output:
The configuration of spheres resulting from this attempt;
Algorithm:
1:  $C := N$ random sphere center points within $D$;
2:  for 0 to *MaxNumRep* do
3:     $C := SPIRepulse(C, D, r)$; // Alg. 5.
4:     if *IsValid(C, D, r)* then
5:         break;
6:     end if
7:  end for
8:  return $C$;

FIG. 8

Input:
$C_{old}$: The configuration of spheres before the repulsion;
$D$: The domain in $\mathbb{R}^3$ to be filled with spheres;
$r$: The sphere radius;
Output:
The configuration of spheres after repulsion;
Algorithm:
1: $C_{new} := \phi$;
2: for all $s_{old} \in C_{old}$ do
3:     $s_{new} := s_{old}$;
4:     for $s_{neighbor} \in C_{old}$ such that $\|s_{neighbor} - s_{old}\| < 2r$ do
5:        $v := s_{neighbor} - s_{old}$;
6:        $s_{new} := s_{new} + \alpha(2r - \|v\|)\frac{v}{\|v\|}$;
7:     end for
8:     $s_{new} := \mathbf{argmin}_{d \in D} \|d - s_{new}\|$; // make sure $s_{new} \in D$.
9:     $C_{new} := C_{new} \cup \{s_{new}\}$;
10: end for
11: return $C_{new}$;

FIG. 9

Input:
$D$: The domain in $\mathbb{R}^3$ to be filled with spheres;
$r$: The sphere radius;
Output:
The best valid configuration of spheres achieved after multiple application of gravity;
Algorithm:
1: $C := GenerateValidHoneycomb(D, r)$;
2: while not $Satisfied()$ do
3:    $C := SP2ApplyRandomGravity(C, D, r)$; // Algorithm 7.
4: end while
5: return $C$;

FIG. 10

Input:
$C$: The configuration of spheres to apply gravity to;
$D$: The domain in $\mathbb{R}^3$ to be filled with spheres;
$r$: The sphere radius;
Output:
The configuration of spheres after applying a gravity force once;
Algorithm:
1: $\vec{g} :=$ random unit vector in $\mathbb{R}^3$;
2: for all $s_i \in C$ in descending order of $(s_i, \vec{g})$ do
3:     $StillMoving := TRUE$;
4:     while $StillMoving$ do
5:         $StillMoving := FALSE$;
6:         Try move $s_i$ in some direction $\vec{g}_{pos}$ such that $(\vec{g}_{pos}, \vec{g}) > 0$;
7:         if succeeded in moving $s_i$ then
8:             $StillMoving := TRUE$;
9:         end if
10:     end while
11: end for
12: $C := SP2TryFillFreeSpace(C, D, r)$;
13: return $C$;

FIG. 11

Input:
$\mathcal{P} = \{P_i\}$: A set of points where the nodes will be placed (e.g., the centers of the spheres computed by a sphere packing algorithm);
$d^{connect}$: The threshold for connecting two nodes by a beam;
$(r^{sphere}, r^{beam}, r^{fillet}, h^{fillet})$: The parameters for constructing the nodes;

Output:
$\mathcal{L}$: A truss lattice, as a set of lattice nodes;

Algorithm:
1: $\mathcal{N}_{P_i} := \{P_j \neq P_i \mid P_j \in \mathcal{P}$ and $|P_j - P_i| \leq d^{connect}\}$; // All nodes neighboring $P_i$.
2: for all $(P_i, P_j) \in \{(P_i \in \mathcal{P}, P_j \in \mathcal{P}) \mid P_i \neq P_j\}$ do // Filter out intersecting beams.
3:    for all $P_k \in \mathcal{N}_{P_i}, P_m \in \mathcal{N}_{P_j}$ do
4:       if $LineSegDist(P_k - P_i, P_m - P_j) < 2r^{fillet}$ and $|P_k - P_i| > |P_m - P_j|$ then
5:          $\mathcal{N}_{P_i} := \mathcal{N}_{P_i} - \{P_k\}$; // Disconnect $P_k$ from $P_i$.
6:          $\mathcal{N}_{P_k} := \mathcal{N}_{P_k} - \{P_i\}$; // And vice-versa.
7:       end if
8:    end for
9: end for
10: $\mathcal{L} := \phi$; // The set of nodes.
11: for all $P_i \in \mathcal{P}$ do
12:    $\mathcal{L} := \mathcal{L} \cup ConstructNode(P_i, r^{sphere}, r^{beam}, r^{Fillet}, h^{fillet})$; // Alg. 9.
13: end for
14: return $\mathcal{L}$;

FIG. 13

Input:
$P_i$: The point at which the node will be constructed;
$\mathcal{N}_{P_i}$: The set of nodes neighboring $P_i$ (see Algorithm 8);
$r_i^{sphere}$: The required radius of sphere $i$;
$r_{i,k}^{beam}$: The required radius of each beam $i,k$;
$r_{i,k}^{fillet}$: The required filleting radius of each beam $i,k$;
$h_{i,k}^{fillet}$: The required filleting height of each beam $i,k$;

Output:
A lattice node (consisting of a sphere $S(u,v)$, and a set of half-beams that emenate from it, $\mathcal{T}$);

Algorithm:
1: $S(u,v):=$ Sphere of radius $r_i^{sphere}$, centered at $P_i$;
2: $\mathcal{T}:=\phi$; // The set of beams.
3: for all $P_j \in \mathcal{N}_{P_i}$ do
4:    $C_{i,k}(t,r):=$ A cylinder of radius $r_{i,k}^{beam}$, height $(\frac{|P_j - P_i|}{2} - h_{i,k}^{fillet} - r_i^{sphere})$, with $(P_j - P_i)$ as its axis, ending at the point $\frac{P_j + P_i}{2}$;
5:    $C_{i,k}(t,u):=$ A fillet of radius $r_{i,k}^{fillet}$ and height $h_{i,k}^{fillet}$, to be $G^1$-continuously joined with both $C_{i,k}(t,r)$ and $S$;
6:    $\mathcal{T}:=\mathcal{T} \cup \{C_{i,k}(t,r) \cup C_{i,k}(t,u)\}$;
7:    $S(u,v):=Clip(S(u,v), BasePlane(C_{i,k}(t,r)))$;
8: end for
9: for all $(C_{i,k}, C_{i,m}) \in \{(C_{i,k}, C_{i,m}) \in \mathcal{T} \times \mathcal{T} \mid m \neq k\}$ do
10:    $c_{inter}:=Intersect(C_{i,k}, C_{i,m})$; // The intersection contour.
11:    if $c_{inter} \neq \phi$ then
12:       $C_{i,k}:=Clip(C_{i,k}, c_{inter})$;
13:    end if
14: end for
15: return $(S(u,v), \mathcal{T})$; // The clipped sphere and the set of (possibly) clipped half-beams.

FIG. 14

Input:
$\mathcal{P} = \{P_i\}$: A set of points where the nodes are to be placed (similarly to Algorithm 8);
$d^{connect}$: The threshold for connecting two nodes by a beam;
$(r^{sphere}, r^{beam}, r^{fillet}, h^{fillet})$: The parameters for constructing the nodes;
$S^{Offset}$: The B-spline boundary surface, representing the interior of the shell model;

Output:
A truss lattice;

Algorithm:

1: $\mathcal{M} := \phi$; // The resulting geometry.
2: for all $P_i \in \{P_i \in \mathcal{P} \mid Dist(P_i, S^{Offset}) \leq d^{connect}\}$ do
3:   $Q_i := ClosestPt(P_i, S^{Offset})$;
4:   $C :=$ A cylinder with $(P_i - Q_i)$ as its axis, centered at $Q_i$;
5:   $c^S := Intersect(S^{Offset}, C)$;
6:   $c^T :=$ A circle normal to $(P_i - Q_i)$, with its center positioned at a distance of $h^{fillet}$ from $Q_i$ along $(P_i - Q_i)$.
7:   $\mathcal{M} := \mathcal{M} \cup \{Fillet(c^S, c^T)\}$; // A $G^1$-cont. $C$-$S^{Offset}$ fillet.
8:   $S^{Offset} := Trim(S^{Offset}, c^S)$;
9:   $N_{P_i} := \{P_i + 2(Center(c^T) - P_i)\}$; // The virtual neighbor, $Q'_i$, in the Section 4.1. $N_{P_i}$ is used in Alg. 8.
10: end for
11: $\mathcal{M} := \mathcal{M} \cup \{S^{Offset}\} \cup LatticeConstruction(\mathcal{P})$; // Alg. 8.
12: return $\mathcal{M}$;

FIG. 19

Input:
$S(u,v)$: The sphere surface at the center of the node;
$\mathcal{T}$: The set of beams, as surfaces;
Output:
A lattice node, represented by compatible tensor-product trivariates;
Algorithm:
1: $\tilde{\mathcal{T}} := \phi$; // The trimmed surface components of all the half-beams.
2: for all $C_{i,k} \in \mathcal{T}$ do
3:    $\mathcal{B}_{i,k} := AllBoundarySrfs(C_{i,k})$; // A set of all the boundary surfaces of $C_{i,k}$.
4:    for all $C_{i,m} \in \mathcal{T} \mid m \neq k$ do
5:      $\mathcal{B}_{i,k} := Clip(\mathcal{B}_{i,k}, C_{i,m})$; // Clip $\mathcal{B}_{i,k}$ against $C_{i,m}$.
6:    end for
7:    $\tilde{\mathcal{T}} := \tilde{\mathcal{T}} \cup \{\mathcal{B}_{i,k}\}$;
8: end for
9: $\mathcal{T}^{triv} := \phi$;
   // Construct all the trivariates in the half-beam:
10: for all $\mathcal{B}_{i,k} \in \tilde{\mathcal{T}}$ do
11:    $K := KernelPointIn(C_{i,k})$; // Find a kernel point in $C_{i,k}$.
12:    $\mathcal{T}^{triv} := \mathcal{T}^{triv} \cup ConstrTrivarElem(\mathcal{B}_{i,k}, K)$; // Untrim all surfaces in $\mathcal{B}_{i,k}$ (if needed), and construct ruled trivariates with $K$.
13: end for
   // Construct all the boundary surfaces of the center sphere, $S(u,v)$:
14: $S^{trim} := AllBoundarySrfs(S(u,v))$;
15: $S^{triv} := \{ConstrTrivarElem(S_j^{trim}, Center(S(u,v))), \forall S_j^{trim} \in S^{trim}\}$;
   // Ruled trivariates between surfaces $S_j^{trim}$ and sphere center.
16: return $S^{triv} \cup \mathcal{T}^{triv}$; // The trivariates representing all the components of the node and half-beams.

FIG. 21

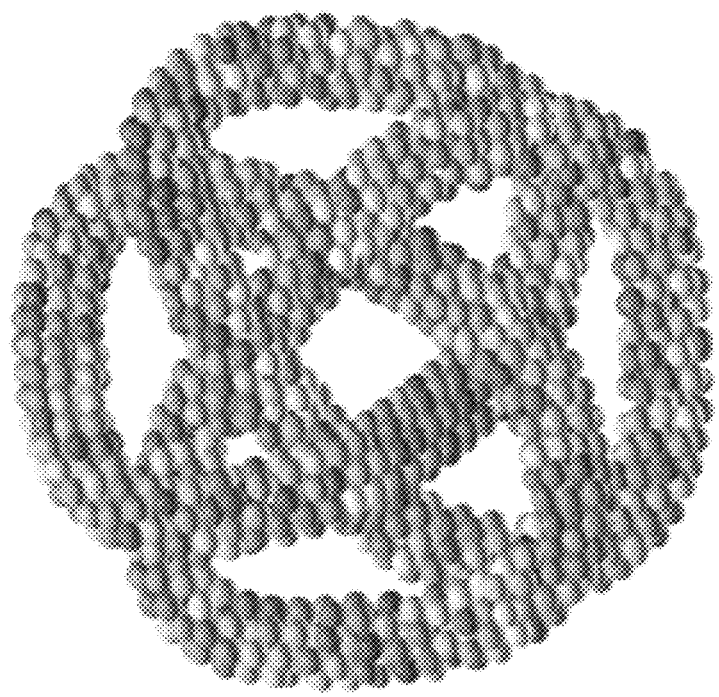
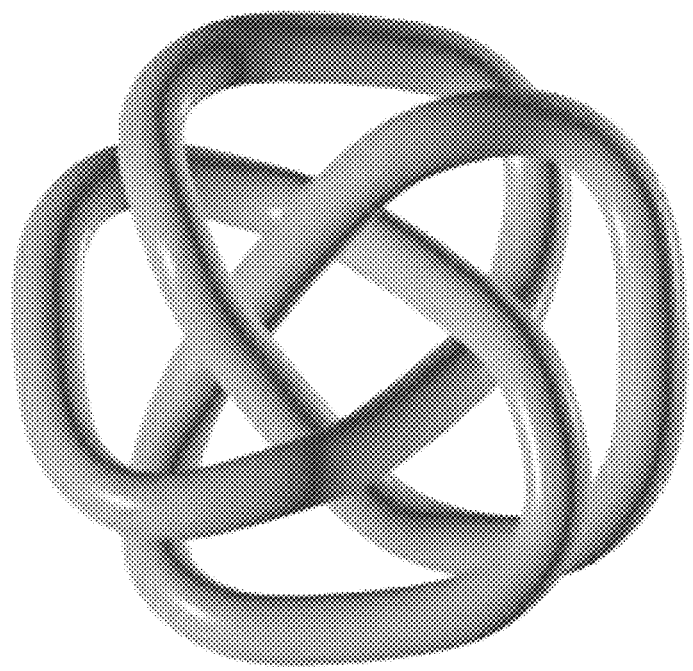
FIG. 27

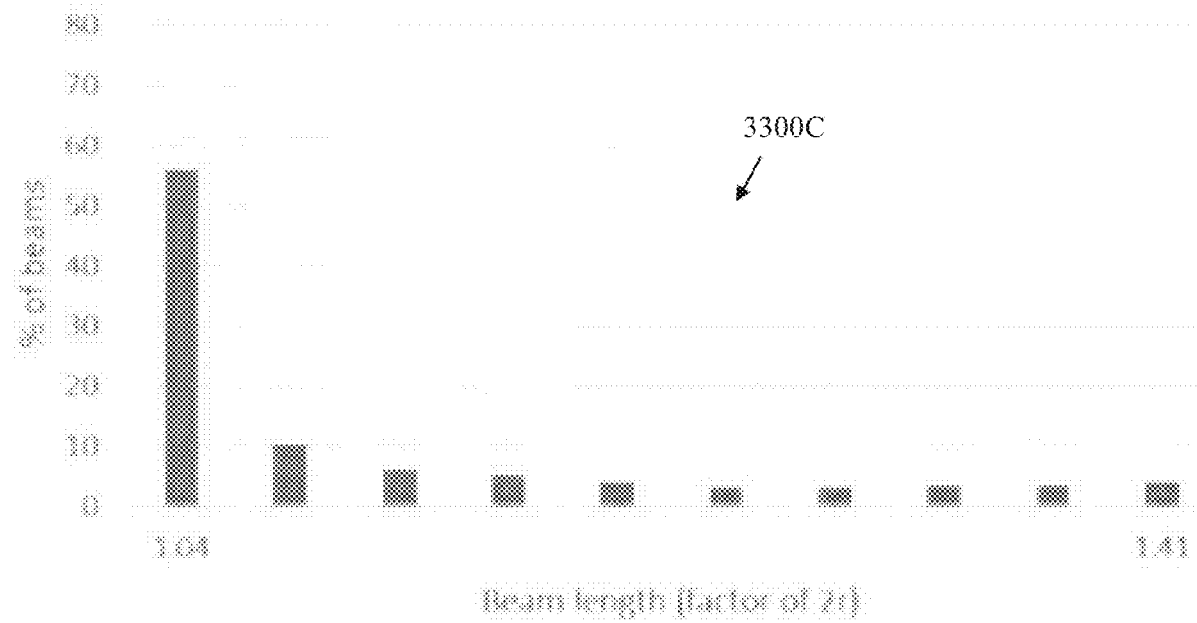
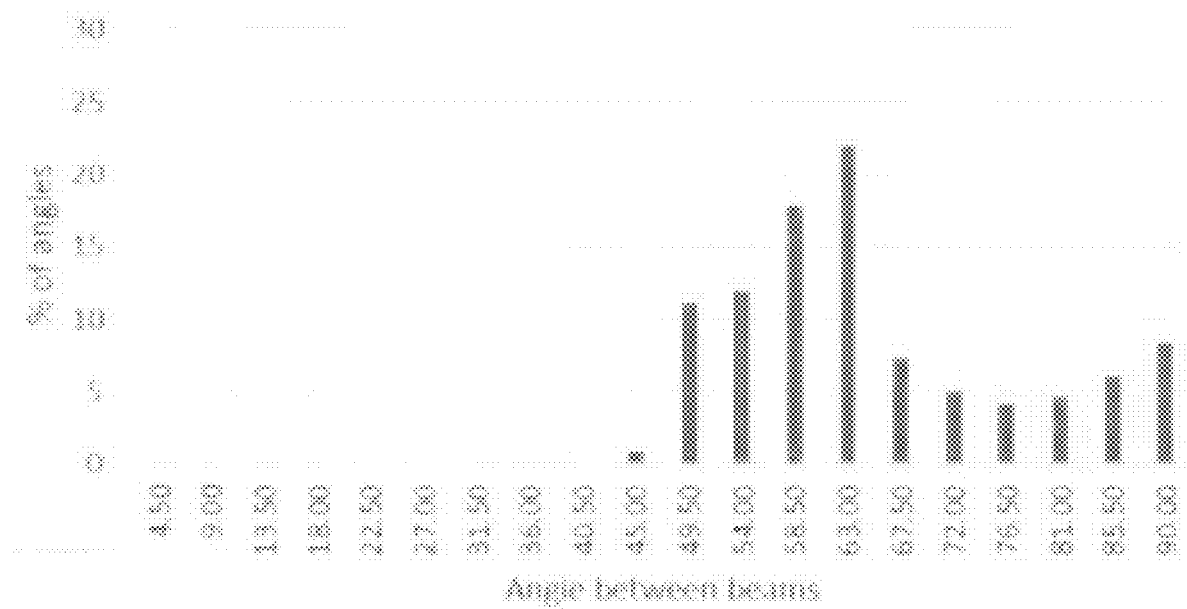
FIG. 32 - Continued

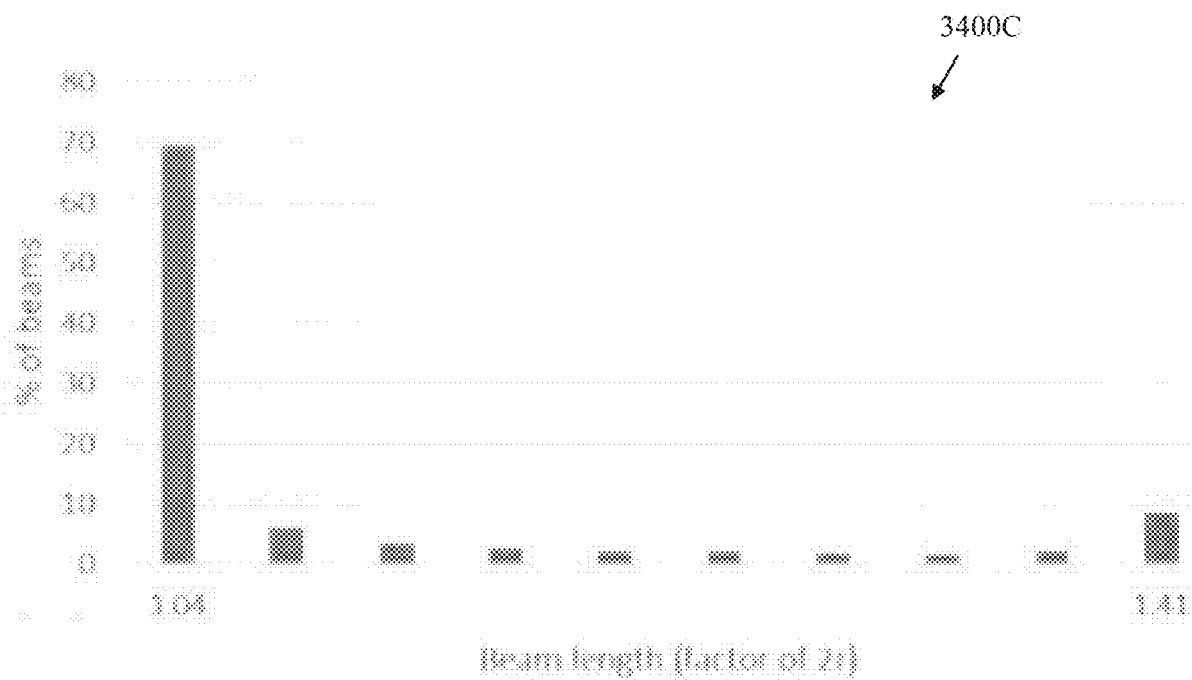
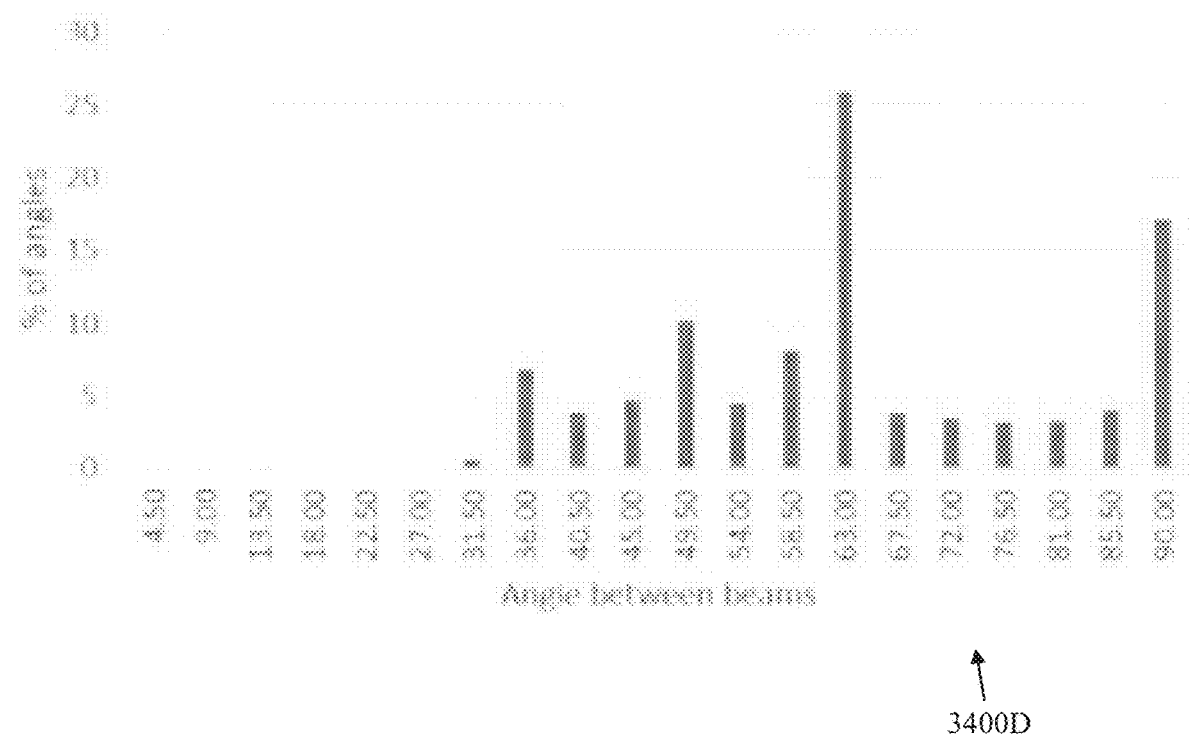
FIG. 33 – Continued

| Model | Figure | BB size | Radius | Algor. | #IniSph | #OptSph | #TrimSrf | #Trivar | Truss t | Trivar t |
|---|---|---|---|---|---|---|---|---|---|---|
| Duck | 2(c) | 2.3 × 1 × 1.1 | 0.05 | RBM | 1019 | 1035 | 12661 | 183596 | 2m4s | 8m2s |
| Duck | 10(c), (d) | 2.3 × 1 × 1.1 | 0.05 | GS | 1019 | 1140 | 14072 | 233503 | 2m34s | 5m15s |
| Duck | 10(a), (b) | 2.3 × 1 × 1.1 | 0.09 | RR | 170 | 230 | 2510 | 52937 | 23s | 1m24s |
| Knot | 16 | 1.9 × 0.8 × 1.9 | 0.04 | GS | 1034 | 1495 | 14357 | 303562 | 1m55s | 11m51s |
| Bunny | 12 | 1.7 × 1.2 × 1.6 | 0.04 | RBM | 2714 | 2805 | 36165 | 501336 | 6m37s | 60m48s |
| Bunny | 11 | 1.7 × 1.2 × 1.6 | 0.06 | RR | 817 | 885 | 10241 | 216024 | 1m43s | 3m59s |
| Bunny | | 1.7 × 1.2 × 1.6 | 0.04 | GS | 2785 | 2990 | 37944 | 594211 | 7m25s | 15m55s |
| Bridge | 15 | 3 × 0.3 × 0.4 | 0.04 | GS | 564 | 666 | 6930 | 116298 | 56s | 2m42s |
| CAD | 13 | 2.8 × 1.8 × 0.4 | 0.06 | GS | 1020 | 1086 | 12576 | 212763 | 1m59s | 4m55s |

FIG. 35

SYSTEMS AND METHODS FOR GENERATION OF A TRUSS

RELATED APPLICATION(S)

This application claims the benefit of priority under 35 USC § 119(e) of U.S. Provisional Patent Application No. 63/021,163 filed on May 7, 2020, the contents of which are all incorporated by reference as if fully set forth herein in their entirety.

FIELD AND BACKGROUND OF THE INVENTION

The present invention, in some embodiments thereof, relates to 3D modelling and, more specifically, but not exclusively, to systems and methods for generation of a truss.

Truss lattices are common in a wide variety of engineering applications, due to their high ratio of strength versus relative density. They are used both as the interior support for other structures, and as structures on their own.

Lattice structures are ubiquitous in engineering, as they appear in plenty of objects of various scales, for example, starting from large trusses in bridges and towers, over medium-sized light-weight metal parts of motorbikes and bicycles, up to microstructures in nano scale such as nanofibers, for example, as described with reference to L. Gil, A. Andreu, *Shape and cross-section optimisation of a truss structure*, Computers & Structures 79 (7) (2001) 681-689. V. R. Gervasi, D. C. Stahl, *Design and fabrication of components with optimized lattice microstructures*, in: Proceedings of the Solid Freeform Fabrication Symposium, Austin, Tex., 2004, pp. 838-844. C. Chu, G. Graf D. W. Rosen, *Design for additive manufacturing of cellular structures*, Computer-Aided Design and Applications 5 (5) (2008) 686-696.

SUMMARY OF THE INVENTION

According to a first aspect, a computer implemented method of manufacturing a truss of a three dimensional (3D) object representation, comprises: receiving a definition of the 3D object representation, arranging within an interior space of the 3D object representation, a plurality of instances of a sphere having a common radius to create a packed sphere arrangement, computing nodes of a truss for the 3D object representation, each respective node positioned at a center of each respective instance of each sphere of the packed sphere arrangement, computing beams of the truss by connecting adjacent nodes with respective beams, and providing code instructions for execution by a manufacturing device controller of a manufacturing device for manufacturing the truss.

According to a second aspect, a system for manufacturing a truss of a three dimensional (3D) object representation, comprises: at least one hardware processor executing a code for: receiving a definition of the 3D object representation, arranging within an interior space of the 3D object representation, a plurality of instances of a sphere having a common radius to create a packed sphere arrangement, computing nodes of a truss for the 3D object representation, each respective node positioned at a center of each respective instance of each sphere of the packed sphere arrangement, computing beams of the truss by connecting adjacent nodes with respective beams, and providing code instructions for execution by a manufacturing device controller of a manufacturing device for manufacturing the truss.

According to a third aspect, a computer program product for manufacturing a truss of a three dimensional (3D) object representation, comprises: a non-transitory memory storing thereon code for execution by at least one hardware process, the code including instructions for receiving a definition of the 3D object representation, arranging within an interior space of the 3D object representation, a plurality of instances of a sphere having a common radius to create a packed sphere arrangement, computing nodes of a truss for the 3D object representation, each respective node positioned at a center of each respective instance of each sphere of the packed sphere arrangement, computing beams of the truss by connecting adjacent nodes with respective beams, and providing code instructions for execution by a manufacturing device controller of a manufacturing device for manufacturing the truss.

In a further implementation form of the first, second, and third aspects, adjacent nodes spaced apart by a distance below a threshold are connected by a respective beam, and adjacent nodes spaced apart by a distance above the threshold are not connected by a respective beam.

In a further implementation form of the first, second, and third aspects, a set of three adjacent nodes form an angle defined by a first straight line defined by a first and second node and by a second straight line defined by the first and a third node (e.g., see FIG. 3), when the angle is equal to sixty degrees and within a tolerance range the set is connected by beams, and when the angle is external to the tolerance range the set is not connected by beams.

In a further implementation form of the first, second, and third aspects, the beams of the truss have a common length corresponding to the common radius of the plurality of instances of the sphere.

In a further implementation form of the first, second, and third aspects, further comprising: iterating the arranging and the computing for a plurality of iterations, wherein during each iteration at least one of the following values is adjusted to create an updated truss: an adjusted value for the common radius of the plurality of instances of the sphere, an adjusted value for a common size and/or shape for the nodes of the truss, and an adjusted value for a common size and/or shape for the beams of the truss.

In a further implementation form of the first, second, and third aspects, a radius denoting thickness of each respective beam varies according to analysis and/or optimization, and/or location, of the respective beam within the 3D object representation.

In a further implementation form of the first, second, and third aspects, arranging comprises packing the plurality of instance of the sphere within the interior space of the 3D object representation by forming tangential contact between neighboring spheres.

In a further implementation form of the first, second, and third aspects, arranging comprises filling the interior space of the 3D object representation with spheres until no space remains therein large enough to accommodate an additional instance of the sphere.

In a further implementation form of the first, second, and third aspects, arranging comprises: positioning a uniformly sized honeycomb structure within the interior space of the 3D object representation, and placing each instance of the sphere within a respective honeycomb.

In a further implementation form of the first, second, and third aspects, arranging comprises: randomly arranging the plurality of instances of the sphere within the interior space of the 3D object representation, wherein at least some of the plurality of instances of the sphere overlap, iteratively randomly perturbing the plurality of instance of the sphere, and computing application of simulated repulsion forces between the plurality of instance of the sphere, wherein the simulated repulsion forces repulse spheres with sufficient simulated force for preventing overlap between instances of the sphere.

In a further implementation form of the first, second, and third aspects, arranging comprises: computing a first arrangement of the plurality of instances of the sphere within the interior space of the 3D object representation, computing a simulation of an external attraction force vector applied in a direction externally to the 3D object representation that simulates attraction of the plurality of instance of the sphere of the first arrangement in the direction, and computing additional instances of the sphere that are placed in open spaces created by the simulation of the external attraction vector force applied to the first arrangement to create a second arrangement of the plurality of instances of the sphere.

In a further implementation form of the first, second, and third aspects, the 3D object representation denotes a boundary, the interior space is enclosed by the boundary, and the truss is computed within the interior space enclosed by the boundary.

In a further implementation form of the first, second, and third aspects, the boundary denoted by the 3D object representation comprises an arbitrary, non-convex, free-form or polygonal boundary.

In a further implementation form of the first, second, and third aspects, the manufacturing device comprises an additive manufacturing device, and the code instructions are for additive manufacturing of the truss, or wherein the code instructions are for manufacturing of a set of beams having either a common size or varying size and/or shape and a set of nodes having either a common size or a varying size and/or shape and instructions for assembling the set of beams and set of nodes into the truss.

In a further implementation form of the first, second, and third aspects, further comprising: computing a boundary shell for the 3D object representation, wherein arranging comprises arranging within the interior space of the boundary shell, that may have fixed or varying controllable thickness, computing nodes of the truss, each respective node positioned at a center of each respective instance of each sphere of the packed sphere arrangement, computing beams of the truss by connecting adjacent nodes with respective beams, and computing beams between nodes of the packed sphere arrangements that are closest to the inner surface of the boundary shell, and points on the inner surface of the boundary shell that are closest to each respective node closest to the inner surface of the boundary shell, thereby connecting the truss to the boundary shell.

In a further implementation form of the first, second, and third aspects, the 3D object representation is represented as a B-spline surface boundary representation, and further comprising: computing nodes of the truss, each respective node positioned at a center of each respective instance of each sphere of the packed sphere arrangement, computing beams of the truss by connecting adjacent nodes with respective beams, computing a complete representation of a boundary surface of each node and a half of each beam connected to each node, by computing interior surfaces which separate each half of each beam from the respective node and from other beams and computing caps for each half of each beam, wherein the boundary surfaces of the nodes and corresponding half of each beam of the truss are represented as trimmed B-spline surfaces, and further comprising converting the boundary surfaces of the nodes and corresponding half of each beam of the truss to tensor-product B-spline surfaces.

In a further implementation form of the first, second, and third aspects, further comprising: computing B-spline trivariates by constructing ruled trivariates between the untrimmed surfaces that from each respective node and corresponding half of each beam and kernel points represented as degenerate surfaces, wherein for surfaces of the node the kernel point is represented as the center of the corresponding node, and for each half of each beam ruled trivariates are constructed between boundary surfaces that form the respective half of each beam and include a base cap, a top cap and separating surface, wherein the kernel point is selected near the base cap.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is an exemplary pseudo code for implementing the first sphere packing process based on "Rigid Body Motion", along with an exemplary sub-routine, in accordance with some embodiments of the present invention;

FIG. 7 is an exemplary pseudocode for implementing the second exemplary sphere packing process using randomization and repulsion, in accordance with some embodiments of the present invention;

FIG. 8 is a pseudocode for implementing the SP1RunAttempt function, which runs a single attempt, in accordance with some embodiments of the present invention;

FIG. 9, which is a pseudocode for implementing the SP1Repulse function, which relates to a repulsion step, in accordance with some embodiments of the present invention;

FIG. 10 is a pseudocode for implementing a third exemplary process for sphere packing by simulation of gravity shaking, in accordance with some embodiments of the present invention;

FIG. 11 is a pseudocode for implementing the SP2ApplyRandomGravit function for simulating application of random gravity, in accordance with some embodiments of the present invention

FIG. 13 is a pseudocode for implementing an exemplary process for computing the lattice, in accordance with some embodiments of the present invention;

FIG. 14 is a pseudocode for implementing an exemplary process for computing a single node, in accordance with some embodiments of the present invention;

FIG. 19 is an exemplary pseudocode for connecting the lattice to the shell, in accordance with some embodiments of the present invention;

FIG. 21 is an exemplary pseudocode for trivariate node construction, in accordance with some embodiments of the present invention;

FIG. 27 is a schematic of the knot-shaped tube 3D object representation model, in accordance with some embodiments of the present invention;

FIG. 35 includes a table which presents statistics on the sphere packing and truss lattice construction for various models, in accordance with some embodiments of the present invention.

DESCRIPTION OF SPECIFIC EMBODIMENTS OF THE INVENTION

Figure 1:
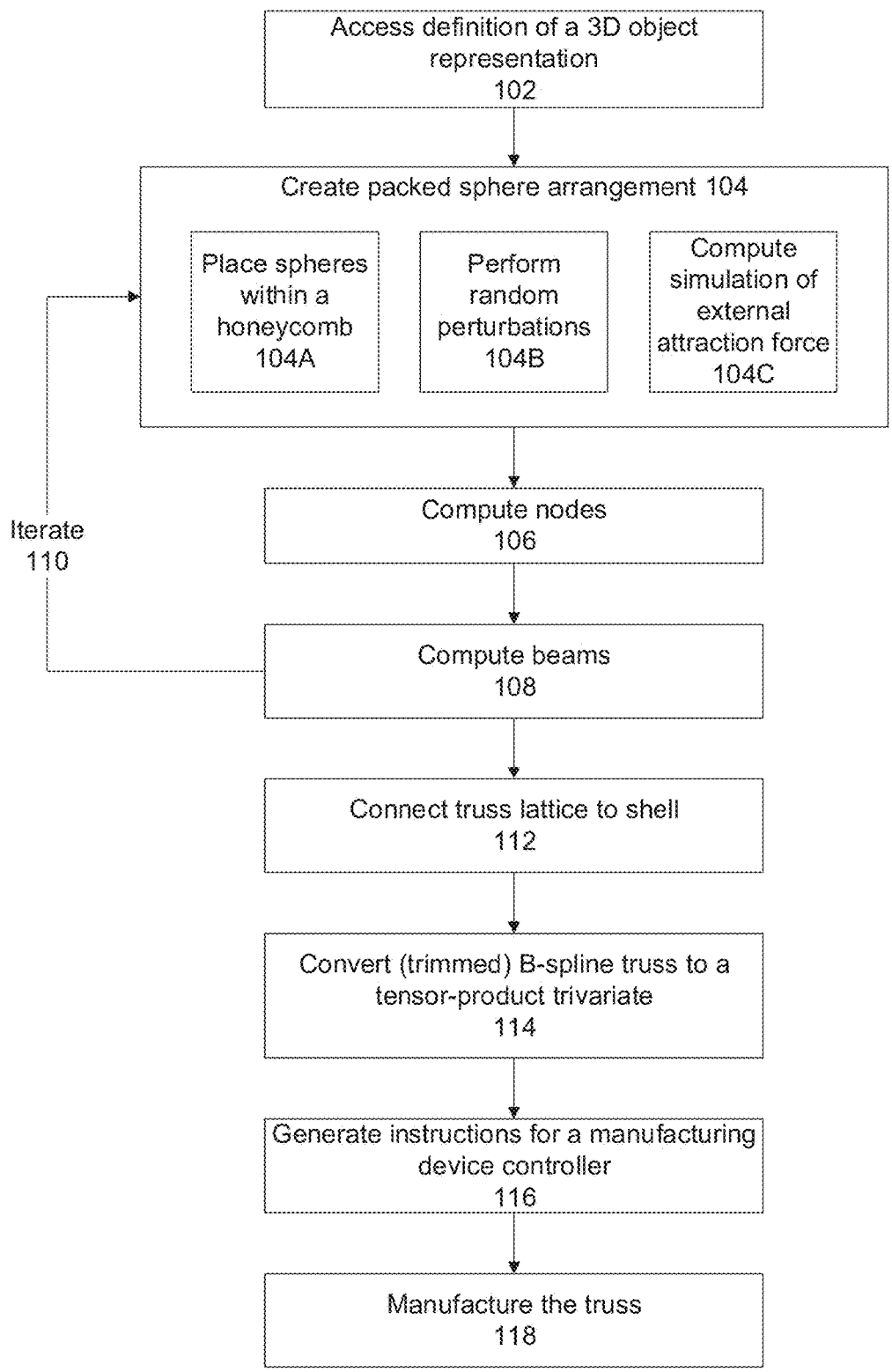
FIG. 1 is a flowchart of a method of manufacturing a truss of a 3D object representation, in accordance with some embodiment of the present invention.

The present invention, in some embodiments thereof, relates to 3D modelling and, more specifically, but not exclusively, to systems and methods for generation of a truss.

An aspect of some embodiments of the present invention relate to systems, methods, an apparatus, and/or code instructions (stored in a memory and executable by one or more hardware processors) for computing a representation of a truss for a three dimensional (3D) object representation, for example, for manufacturing of the truss and/or analysis of the truss (e.g., isogeometric analysis). Instances of a sphere having a common radius are arranged within an interior space of the 3D object representation to create a packed sphere arrangement. A truss for the 3D object representation is computed based on the sphere arrangement.

Optionally, code instructions are provided for execution by a manufacturing device controller of a manufacturing device for manufacturing the truss. The truss may be manufactured.

The truss includes nodes and beams connecting nodes. The nodes of the truss are computed by positioning each respective node at the center of each respective instance of each sphere of the packed sphere arrangement. Beams of the truss are computed by connecting adjacent nodes with respective beams.

At least some implementations of the systems, methods, apparatus, and/or code instructions described herein relate to an end-to-end process for packing a 3D object representation (e.g., B-rep model) with spheres and a consequent construction of a truss lattice structure. Such a lattice connects the centers of the spheres with beams and fills the interior of the 3D object representation (or designated portion thereof). Three exemplary sphere packing processes are provided. Two optional features for the truss lattice construction process are provided. One feature allows connecting the truss lattice to a shell of the 3D object representation. The other feature converts the (trimmed) B-spline truss lattice to a tensor-product trivariate model.

As used herein, the term packed (e.g., packed spheres) may refer to an arrangement of non-overlapping spheres (having a same radius) within a 3D object representation or portion thereof, where no additional spheres may be inserted, for example, due to lack of remaining space in the 3D object representation of portion thereof. As used herein, the term arrangement (i.e., of spheres with a common radius) may sometimes refer to a packed arrangement (i.e., of spheres with a common radius).

As used herein, the term 3D object representation may sometimes be interchanged with, and/or combined with, the term geometric object or geometric model.

At least some implementations of the systems, methods, apparatus, and/or code instructions described herein address the technical problem of automatically generating a representation of a lattice structure for manufacture thereof. Lattice structures may be regarded as a composite material, including solid materials and optionally voids, for example, as described with reference to N. A. Fleck, *An overview of the mechanical properties of foams and periodic lattice materials*, Cell Met Polym (2004) 3-7. The relative density, $\bar{\rho}$, of a lattice structure may be calculated as the ratio between the volume occupied by the solid material and the total volume of the object (including the void space), mathematically denoted $$\bar{\rho} = \frac{V_{material}}{V_{total}}.$$

A truss lattice may be a lattice whose infrastructural design includes interlaced beams that are mutually cross-linked to provide higher stability and strength to a structure. Therefore, truss lattices may be an attractive choice for a wide variety of engineering applications due to a high strength compared to small relative density.

The construction of truss lattice structures poses several technical problems. The layout of the nodes and the design of the beams that connect them is an important issue, as the layout may affect the relative density, $\bar{\rho}$, and/or the mechanical properties of the overall structure. Finding the optimal balance of the connectivity of nodes of the lattice is another technical problem. On the one hand, the nodal connectivity should be high enough to guarantee the rigidity of the lattice structure, however on the other hand, when the connectivity is too high, the connectivity may needlessly increase $\bar{\rho}$, for example, as described with reference to S. Pellegrino, C. R. Calladine, *Matrix analysis of statically and kinematically indeterminate frameworks*, International Journal of Solids and Structures 22 (4) (1986) 409-428. Yet another technical problem relates to the lattice requirement to support some other connected structure(s) of an arbitrary shape, and therefore the geometry that connects the lattice and the arbitrary shape should be part of the overall considerations.

It is noted that a 2014 survey described with reference to A. Hadi, F. Vignat, F. Villeneuve, *Evaluating current cad tools performances in the context of design for additive manufacturing*, in: Proceedings of Joint Conference on Mechanical, Design Engineering & Advanced Manufacturing, 2014 argued that, in the context of additive manufacturing, CAD tools were, at that time, ill-adapted for designed lattice structures.

At least some implementations of the systems, methods, apparatus, and/or code instructions described herein provide a technical solution to the above mentioned technical problem by packing a 3D object representation (the volume within which the lattice structure is computed) with spheres having a common radius, and computing the truss lattice structure based on the arrangement of the packed spheres.

A tight sphere packing may be used to compute the truss lattice structure that includes octet or hexagonal cells that fills the interior parts of the 3D object representation, which may support the parts of the 3D object representation closer to the boundary.

It is noted that approaches using Delaunay-like triangulations correspond to overlapping spheres and are not necessarily relevant. However, such overlapping sphere arrangements may be used in some implementations described herein, for example, for setting an initial arrangement of spheres to which simulated repulsion forces are applied.

At least some implementations of the systems, methods, apparatus, and/or code instructions described herein provide technical improvements over other previous approaches for generating lattice structures from geometric models. For example, S. R. Musuvathy, Method for creating three dimensional lattice structures in computer-aided design models for additive manufacturing, U.S. Pat. No. 9,902,114 (February 2018) proposes a method for filling a geometric model with axis-aligned lattices, which then need to be clipped at the boundary of the model in order to fit its geometry. In another approach, the lattice is deformed to follow the interior volumetric parameterization, as described with reference to F. Massarwi, J. Machchhar, P. Antolin, G. Elber, *Hierarchical, random and bifurcation tiling with heterogeneity in micro-structures construction via functional composition*, Computer-Aided Design 102 (2018) 148-159. The two previously mentioned approaches, however, are heavily dependent on the initial orientation of the model, i.e., to be nicely aligned with the axes, and/or on the volumetric parametrization, which is non-trivial for complex shapes. In contrast, at least some implementations of the systems, methods, apparatus, and/or code instructions described herein may be implemented with any arbitrary shapes of the 3D object representation, including complex shapes.

With applications in either geometry processing or finite elements, another class of approaches uses sphere packing as a tool to construct well-behaved meshes, for example, as described with reference to K. Shimada, D. C. Gossard, *Bubble mesh: automated triangular meshing of non-manifold geometry by sphere packing*, in: Proceedings of the third ACM symposium on Solid modeling and applications, 1995, pp. 409-419, J. Liu, S. Li, Y. Chen, *A fast and practical method to pack spheres for mesh generation*, Acta Mechanica Sinica 24 (4) (2008) 439-447, and S. Lo, W. Wang, *Generation of tetrahedral mesh of variable element size by sphere packing over an unbounded 3d domain*, Computer methods in applied mechanics and engineering 194 (48-49) (2005) 5002-5018. Given a 2D (3D) domain, the goal is to find a triangular (tetrahedral) discretization using the duality principle between packed spheres and a mesh. As the error of the finite element approximation is affected by the shape of the domain, regular, Delaunay-like, triangulations are preferable. Sphere packing may be used for prevention of creating degenerate triangles (tetrahedra), as described with reference to K. Shimada, D. C. Gossard, *Bubble mesh: automated triangular meshing of non-manifold geometry by sphere packing*, in: Proceedings of the third ACM symposium on Solid modeling and applications, 1995, pp. 409-419. In this class of literature, however, the sphere arrangement allows overlaps and/or have small gaps between neighboring spheres and therefore are not be considered as sphere packings in the classical Kepler's sense, i.e., packing where neighboring spheres possess a tangential contact, for example, as described with reference to J. H. Conway, C. Goodman-Strauss, N. J. Sloane, *Recent progress in sphere packing*, Current Developments in Mathematics 1999 (1) (1999) 37-76.

At least some implementations of the systems, methods, apparatus, and/or code instructions described herein pack spheres into the 3D object representation by arranging the spheres in tangential contact with one another. Such arrangement is different than other prior approaches. For example, J. H. Conway, C. Goodman-Strauss, N. J. Sloane, *Recent progress in sphere packing*, Current Developments in Mathematics 1999 (1) (1999) 37-76 considers spherical packings in unbounded domains of various dimensions, which is different than packing spheres into a 3D object representation, in particular when the truss generated from the packed spheres is to be manufactured. In another example, Y. Stoyan, G. Yaskov, *Packing congruent spheres into a multiconnected polyhedral domain*, International Transactions in Operational Research 20 (1) (2013) 79-99 looks for a packing of the maximal number of congruent spheres into a polyhedral containers in $\mathbb{R}^3$. The mathematical formulation is based on $\Phi$-functions and is validated by examples on simple convex polytopes which can contain some polyhedral obstacles inside, such as polygonal prisms, convex polyhedral cones and dihedral angles. In contrast, at least some implementations of the systems, methods, apparatus, and/or code instructions described herein support arbitrary (non-convex) free-form boundary. Moreover, neither of the two previously mentioned processes teach or relate to designing of a truss lattice structure that conforms to arbitrary freeform geometry.

Another example is described with reference to A. Schiftner, M. Höbinger, J. Wallner, H. Pottmann, *Packing circles and spheres on surfaces*, in: ACM SIGGRAPH Asia 2009 papers, 2009, pp. 1-8, which is motivated by free-form architectural design that consists of congruent and repetitive elements, packing circles and spheres was applied to curved surfaces (manifolds). A concept of a circle packing mesh is introduced. In such a triangular mesh, the incircles of the triangles form a packing, i.e., the incircles of two triangles with a common edge have the same contact point on that edge. An optimization based framework is proposed to demonstrate that circle packing meshes can conform to arbitrary free-form geometry.

Another example is described with reference to A. Gupta, G. Allen, J. Rossignac, *Quador: Quadric-of-revolution beams for lattices*, Computer-Aided Design 102 (2018) 160-170, where a representation of lattice structures based on the union of spherical nodes quador (quadric of revolution) beams is proposed. This representation uses closed-form expressions for all the components of the lattice, and allows to control over the profile of the beams by adjustable parameters. The connection between the beams and the nodes is guaranteed to be smooth, and symbolic expressions for the curves at which the contact occurs are provided. In A. Gupta, K. Kurzeja, J. Rossignac, G. Allen, P. S. Kumar, S. Musuvathy, *Programmed-lattice editor and accelerated processing of parametric program-representations of steady lattices*, Computer-Aided Design 113 (2019) 35-47, an ad-hoc programming language and a user graphic interface have been introduced to design truss lattices. A whole end-to-end additive manufacturing pipeline is presented, from design to the final fabrication. Both of the previously mentioned references require the user to explicitly define the shape of the lattice, rather than fitting it to a given geometry. In contrast, at least some implementations of the systems, methods, apparatus, and/or code instructions described herein is designed for constructing a truss lattice based on a sphere packing of the interior of the model, and therefore, attempts to fit its geometry. The user is not necessarily required to explicitly specify the structure of the lattice. Additionally, at least some implementations of the systems, methods, apparatus, and/or code instructions described herein may provide control over the resulting lattice with a small number of parameters, but in contrast to A. Gupta, K. Kurzeja, J. Rossignac, G. Allen, P. S. Kumar, S. Musuvathy, *Programmed-lattice editor and accelerated processing of parametric program-representations of steady lattices*, Computer-Aided Design 113 (2019) 35-47, different lattices may be iteratively and automatically computed (e.g., to find an optimal design) without requiring the user to explicitly define he structure of each lattice.

Yet another example is another family of processes that deal with volumetric representation in the context of isogeometric analysis. Analysis suitable volumetric parametrizations (meshes) should respect the information coming from the boundary, such as normal vectors or curvatures, and an efficient algorithm that computes such paremetrization is introduced in C. L. Chan, C. Anitescu, T. Rabczuk, *Volumetric parametrization from a level set boundary representation with pht-splines*, Computer-Aided Design 82 (2017) 29-41. A volumetric parametrization that minimizes the distortion of the mapping between the domain (unit cube) and physical domain is computed using harmonic map in M. Pan, F. Chen, W. Tong, *Volumetric spline parameterization for isogeometric analysis*, Computer Methods in Applied Mechanics and Engineering 359 (2020) 112769. At least some implementations of the systems, methods, apparatus, and/or code instructions described herein may be considered as a step towards volumetric representations of curved objects composed of a specific microstructure (truss lattice).

In summary, at least some implementations of the systems, methods, apparatus, and/or code instructions described herein are the first to automatically construct interior trusses for closed B-rep (boundary representation) models, trusses that are conforming to the shape of the input model. The input may be any closed B-rep model in any representation, including polygonal or freeform surfaces, and the output is a B-rep or a V-rep model of the interior truss that conform to the input model. This, with the aid of sphere packing algorithms, in 3D, that were never used in this context. This, in contrast to F. Massarwi, J. Machchhar, P. Antolin, G. Elber, *Hierarchical, random and bifurcation tiling with heterogeneity in micro-structures construction via functional composition*, Computer-Aided Design 102 (2018) 148-159 that can create a conforming input truss but requires a volumetric (trivariate) representation) and for many others that employ a B-rep input model but cannot deform the truss to conform to the input model.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
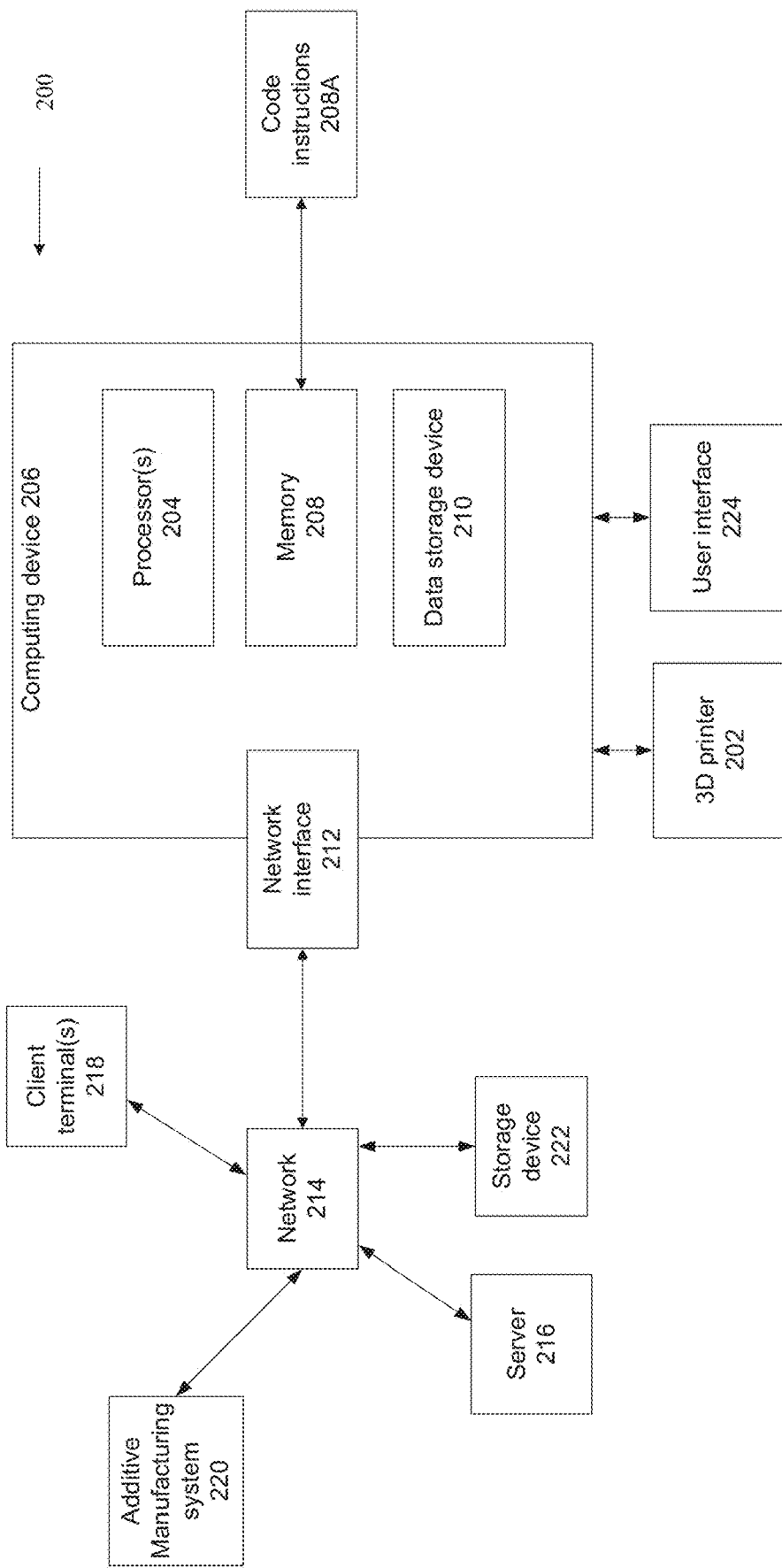
FIG. 2 is a block diagram of a system 200 manufacturing a truss of a 3D object representation, in accordance with some embodiment of the present invention.

Reference is now made to FIG. 1, which is a flowchart of a method of manufacturing a truss of a 3D object representation, in accordance with some embodiment of the present invention. Reference is also made to FIG. 2, which is a block diagram of a system 200 for manufacturing a truss of a 3D object representation, in accordance with some embodiment of the present invention. System 200 may execute the acts of the method described with reference to FIG. 1, for example, by a processor 204 of a computing device 206 executing code instructions stored in a memory 208.

A 3D printer 202 may print the 3D trusses by depositing materials using a printer head that deposits materials. 3D printer 202 may be a standard existing printer (for example, designed to print parallel slices to create the 3D object, one slice at a time, from lower layers to higher layers) and/or may be based on other 3D printing approaches. The term 3D printer may refer to other additive manufacturing devices and/or other manufacturing device which are not necessarily additive that use other technologies for manufacturing of 3D objects.

Computing device 206 may be integrated with 3D printer 202, for example, as a control console and/or control device and/or instructions code stored within 3D printer 202. Alternatively or additionally, computer device 206 may be implemented as a device external to 3D printer 202, that computes a representation of the truss and provides the representation of the truss (e.g., transmitted using a communication channel such as a network, or obtained from a storage device) to 3D printer 202 for manufacturing thereof. For example, a computing device 206 may be implemented as, for example, a client terminal, a server, a mobile device, a desktop computer, a thin client, a Smartphone, a Tablet computer, a laptop computer, a wearable computer, glasses computer, and a watch computer. Computing device 206 may include locally stored software that performed one or more of the acts described with reference to FIG. 1, and/or may act as one or more servers (e.g., network server, web server, a computing cloud) that provides services (e.g., one or more of the acts described with reference to FIG. 1) to one or more client terminals, for example, providing software as a service (SaaS) to the client terminal(s), providing an application for local download to the client terminal(s), and/or providing functions using a remote access session to the client terminals, such as through a web browser.

Processor 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include one or more processors (homogenous or heterogeneous), which may be arranged for parallel processing, as clusters and/or as one or more multi core processors.

Memory 208 stores code instructions implementable by processor 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). For example, memory 208 may store code instructions 208A that executes one or more acts of the method described with reference to FIG. 1.

Computing device 206 may include a data storage device 210 for storing data, for example, a computer aided design (CAD) application for use by a user to design the 3D object for which the truss is computed, and/or analysis code that analyzes the truss. Data storage device 210 may be implemented as, for example, a memory, a local hard-drive, a removable storage unit, an optical disk, a storage device, and/or as a remote server and/or computing cloud (e.g., accessed using a network connection). It is noted that code instructions 208A may be stored in data storage 210, for example, with executing portions loaded into memory 208 for execution by processor 204.

Computing device 206 may include a network interface 212 for connecting to a network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 206 may access one or more remote servers 216 using network 214, for example, to download the initial definition of the geometric object, and/or to provide the generated set of univariate curves.

Computing device 206 may connect using network 214 (or another communication channel, such as through a direct link (e.g., cable, wireless) and/or indirect link (e.g., via an intermediary computing device such as a server, and/or via a storage device) with one or more of:

Client terminal(s) 218, for example, when computing device 206 acts as a server providing SaaS.

A remotely located additive manufacturing system 220 that manufactures the truss. It is noted that 3D printer 202 may be locally located and connected to computing device 206 (e.g., integrated within, connected by a cable, connected by a short range wireless communication protocol, connected by a local network), and AM system 220 may be remotely located and connected to computing device 206 using network 214. It is noted that other manufacturing device which are not necessarily additive that use other technologies may be used for manufacturing of the truss.

A storage device 222 that stores the initial definition of the 3D object representation (e.g., provided by client terminal 218, server 216, and/or used by computing device 206 for remote storage) and/or the computed truss (e.g., created by computing device 206 for use, for example, by manufacturing system 220 for manufacturing the 3D object). Storage device 222 may include, for example, a storage server, a computing cloud storage server, or other implementations.

Computing device 206 includes or is in communication with a user interface 224 that includes a mechanism designed for allowing a user to enter data and/or view presented data. Exemplary user interfaces 224 include, for example, one or more of, a touchscreen, a display, a keyboard, a mouse, and voice activated software using speakers and microphone.

Referring now back to FIG. 1, at 102, a definition of the 3D object representation is accessed. For example, the definition of the 3D object representation may be designed by a user using a design package, obtained from local or remote storage, transmitted by a remote client, and the like.

Optionally, the 3D object representation denotes a boundary that encloses an interior space. The truss is computed within the interior space enclosed by the boundary. The boundary denoted by the 3D object representation may be an arbitrary, non-convex, free-form and/or polygonal boundary.

Optionally, the 3D object representation is represented as a set of (optionally trimmed) surfaces boundary representation (B-rep). Alternatively or additionally, the 3D object representation is represented as a set of piecewise linear polygonal meshes B-rep. Alternatively or additionally, the 3D object representation is represented as a trivariate parametric volume representation. Alternatively or additionally, the 3D object representation is represented as a trimmed trivariate parametric volume representation, for example, as described with reference to Fady Massarwi and Gershon Elber. *A B-spline based framework for volumetric object modeling. Computer Aided Design*, Vol 78, pp 36-47, September 2016.

At 104, multiple instances of a sphere are arranged (i.e., computationally) within an interior space of the 3D object representation to create a packed sphere arrangement. The multiple instances of the sphere may have a common radius. Alternatively, different instances of the sphere have different radii, for example, smaller radii at smaller interior volumes and larger radii at larger interior volumes.

The instance of the sphere may be packed within the interior space of the 3D object representation by forming tangential contact between neighboring spheres.

The interior space of the 3D object representation may be filled with spheres until no space remains therein large enough to accommodate an additional instance of the sphere.

Figure 3:
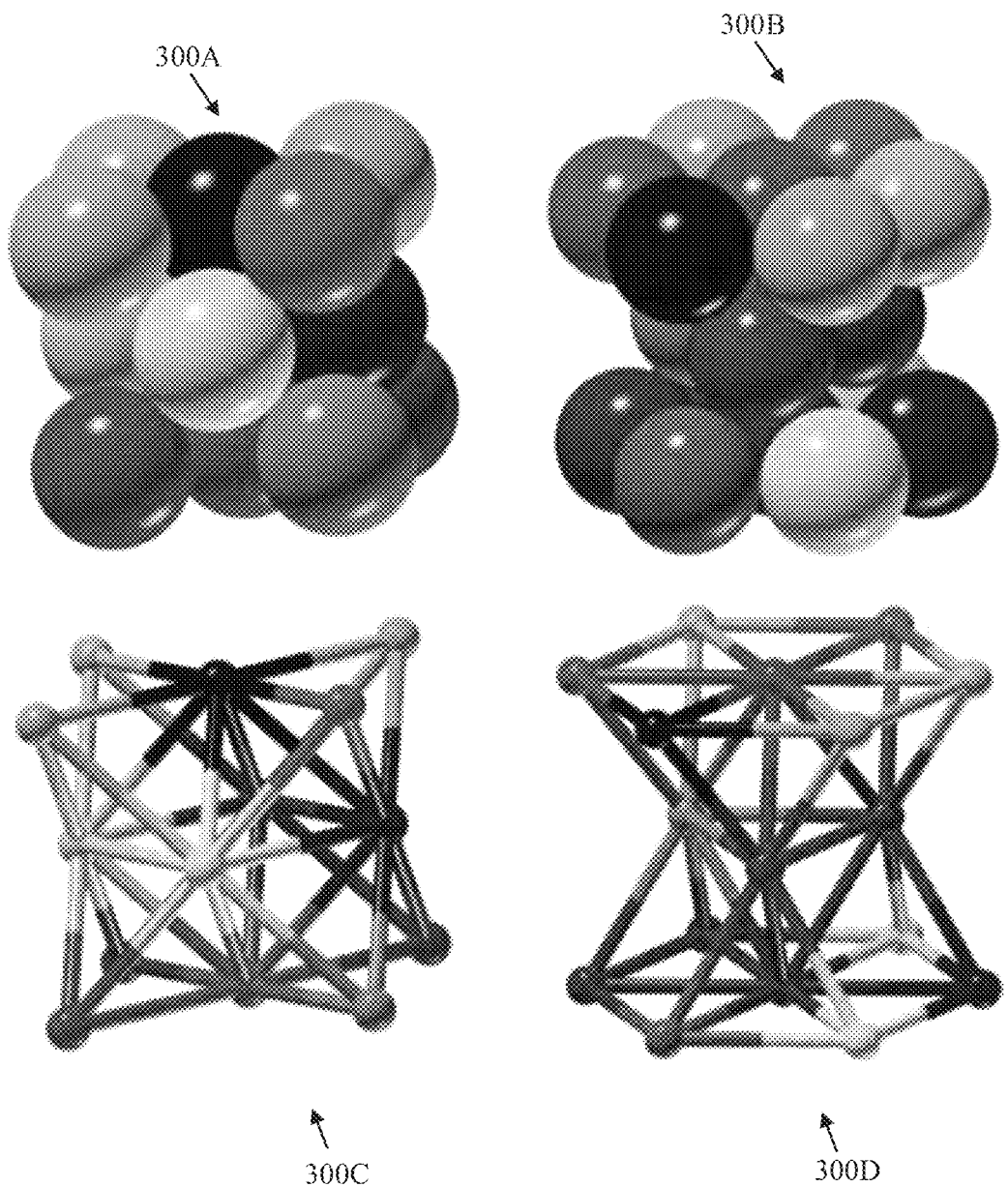
FIG. 3, which is a schematic depicting two exemplary arrangements of spheres of equal radius in 3D space, in accordance with some embodiment of the present invention.

Reference is now made to FIG. 3, which is a schematic depicting two exemplary arrangements of spheres of equal radius in 3D space, in accordance with some embodiment of the present invention. The exemplary arrangements of the spheres are obtained by connecting centers of adjacent spheres. The arrangement of packed spheres is designed to achieve maximum density. The depicted exemplary packed sphere arrangements include face-centered cubic (fcc) packing 300A, and hexagonal close packing (hcp) 300B, for example, as described with reference to J. H. Conway, N. J. A. Sloane, *Sphere packings, lattices and groups, Springer Science & Business Media*, 2013, Ch. 1, pp. 2,8. In an fcc cell, fourteen spheres are arranged on the vertices and on the centers of the faces of a cube. The centers of any two spheres that are in tangential contact with each other, also referred to as nodes, are connected by a beam. The resulting truss structure is called the octet cell as depicted in a corresponding octet cell 300C, for example, as described with reference to R. B. Fuller, *Synergetics: explorations in the geometry of thinking, Estate of R. Buckminster Fuller*, 1982, Ch. 420, pp. 138-140. In an hcp cell, the spheres, also referred to as nodes, are arranged as a triangle sandwiched between two hexagons as depicted in a corresponding hexagonal cell 300D.

Another example of sphere packing for designing truss lattices is arranging the spheres in a sheet of tetrahedral structures, for example, as described with reference to H. G. Allen, *Analysis and design of structural sandwich panels: the commonwealth and international library: structures and solid body mechanics division*, Elsevier, 2013. A tetrahedral lattice cell is formed by taking two layers of optimally-packed spheres, such as the two bottom layers of hcp, or two diagonal layers of fcc, for example, regarded as a special case of both fcc and hcp. Sheets of tetrahedrons made of trusses (sometimes referred to as tetrahedral-core sheets), including non-planar variants, are used extensively in engineering and construction as support linkages and stabilizers, for example, as described with reference to N. Wicks, J. W. Hutchinson, *Optimal truss plates, International Journal of Solids and Structures* 38 (30-31) (2001) 5165-5183, F. W. Zok S. A. Waltner, Z. Wei, H. J. Rathbun, R. M. McMeeking, A. G. Evans, *A protocol for characterizing the structural performance of metallic sandwich panels: application to pyramidal truss cores, International Journal of Solids and Structures* 41 (22-23) (2004) 6249-6271, and G. Zhang, L. Ma, B. Wang, L. Wu, *Mechanical behaviour of cfrp sandwich structures with tetrahedral lattice truss cores, Composites Part B: Engineering* 43 (2) (2012) 471-476. For existing lattice systems such as described with reference to SYMA systems, SYMA-orbit, the space-truss, https://www(dot)syma(dot)com/en/systems/inspiring-systems/syma-orbit, the beams are congruent (i.e., beams of custom-length require custom nodes which is very expensive and not supported in general). Therefore, sphere packing arrangements that preserve the tangential contact between the spheres are considered, i.e., the distance between the centers of two neighboring spheres, denoted 2r, may be, within a tolerance range (e.g., based on machining precision).

Referring now back to FIG. 1, 104A-C represent different approaches for arranging the spheres within the interior space of the 3D object representation, i.e., computing packing of spheres in the 3D object representation. The approaches may be alternatives, or may be used in combination. A single approach may be selected, or multiple approaches may be used, sequentially, and/or in parallel, and/or in different sub-volumes of the interior space.

The goal of each of these processes is to find a configuration of as many-as-possible congruent spheres of a given radius such that the spheres lie within a given shape. As used herein, the phrase "within a given shape" refers to "center of each sphere lies within the shape".

First, a formal mathematical definition of the problem is provided. Given a bounded closed continuous domain denoted $D \subset \mathbb{R}^3$ (with a surface boundary denoted $\partial D$) and a sphere radius denoted r, the process tries to find a configuration denoted $C=\{s_1, s_2, \ldots, s_n \in \mathbb{R}^3\}$ (a finite set of centers of spheres) such that $\forall$ $s_i \in C$, $s_i \in D$ and $\forall s_i, s_j \in C$, $i! = j$, $\|s_i - s_j\| \geq 2r$. The last two conditions are referred to herein as inclusion and non-penetration, respectively, and any configuration that satisfies these two conditions is referred to herein as a valid configuration.

The three exemplary processes described herein proposed herein for a general freeform shape denoted D are heuristic, iteration-based, and produce increasingly better results. A first process attempts to find a rigid motion that will optimally position a given initial honeycomb configuration of packed spheres inside the domain. A second process employs a naive repelling approach, which, however, produces good results. A third process tries to iteratively improve an existing configuration, using simulated gravity forces. All three processes may be parallelized.

At 104A, the first packing optimization process relates to the spheres being arranged by positioning a uniformly sized honeycomb structure within the interior space of the 3D object representation. Each instance of the sphere is placed within a respective honeycomb.

The initial honeycomb layout is moved fully rigidly such that the maximum number of spheres (i.e., sphere centers) lies inside D. In some cases, it might be desired to provide regular packing so the truss structure will consist solely of regular beams.

Figure 4:
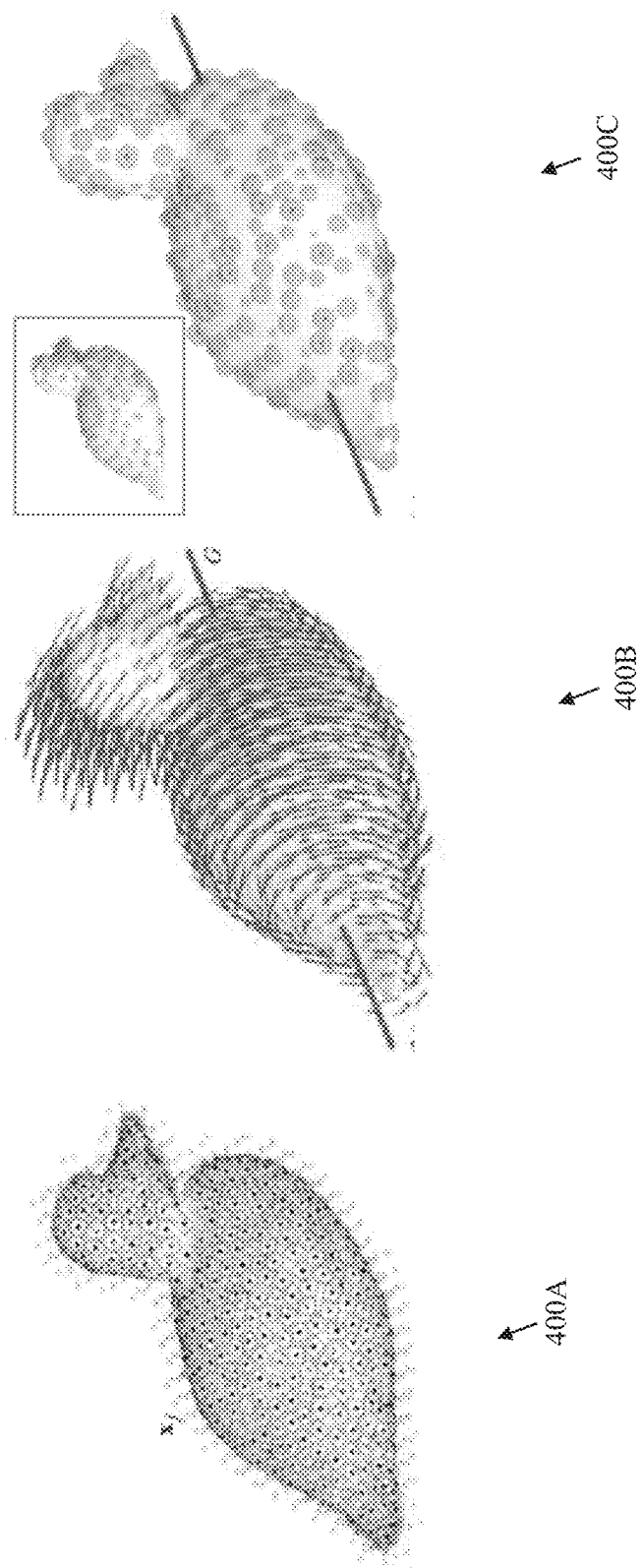
FIG. 4, which is a schematic depicting one iteration of a first sphere packing process based on "Rigid Motion Body", in accordance with some embodiments of the present invention.

Consider an initial honeycomb layout that covers the whole D and also some exterior neighborhood, refer to FIG. 4.

Reference is now made to FIG. 4, which is a schematic depicting one iteration of a first sphere packing process based on "Rigid Motion Body", in accordance with some embodiments of the present invention. At 400A, the sphere centers from the exterior neighborhood (yellow) are orthogonally projected onto $\partial D$, resulting in a set of footpoints (black) and tangent planes (blue) of D. At 400B, the best instantaneous motion that moves the exterior centers towards D is computed via Equation (4), resulting in a vector field (c, c̄) (green); for visualization purposes, the vector field is scaled by factor of 60. This vector field corresponds to a helical motion with an axis denoted G, whose Plücker coordinates (g, ḡ) are computed via Equation (5). At 400C, the optimized honeycomb layout of the spheres (with all centers inside D). The position of the spheres before the optimization is shown top framed.

The exterior neighborhood of ∂D is defined as the space between ∂D and an outer offset of D, s being the offsetting distance (ε is a parameter, set experimentally to 4r in an exemplary implementation). The sphere centers may be categorized, for example, as internal (I), i.e., those that lie inside D, and external (E) which are those that lie in the exterior neighborhood of D.

The process includes looking for a rigid body motion that moves the initial honeycomb layout such that as-many-as-possible sphere centers are located inside D. This is formulated as an optimization problem as follows. Considering the first order approximation of the rigid body motion, an instantaneous motion (e.g., a screw), defined by its projective coordinates denoted $(c, \bar{c}) \in \mathbb{P}^6$. The screw coordinates are points in 6-dimensional projective space $\mathbb{P}^6$, i.e., the six-tuple defines a screw up to a non-zero multiplication factor. Then an instantaneous velocity vector denoted v(x) of a point denoted $x \in \mathbb{R}^3$ may be computed as:

$$v(x) = \bar{c} + c \times x \quad \text{Equation (1)}$$

for example, as described with reference to H. Pottmann, J. Wallner, *Computational line geometry*, Springer Science & Business Media, 2009.

Figure 5:
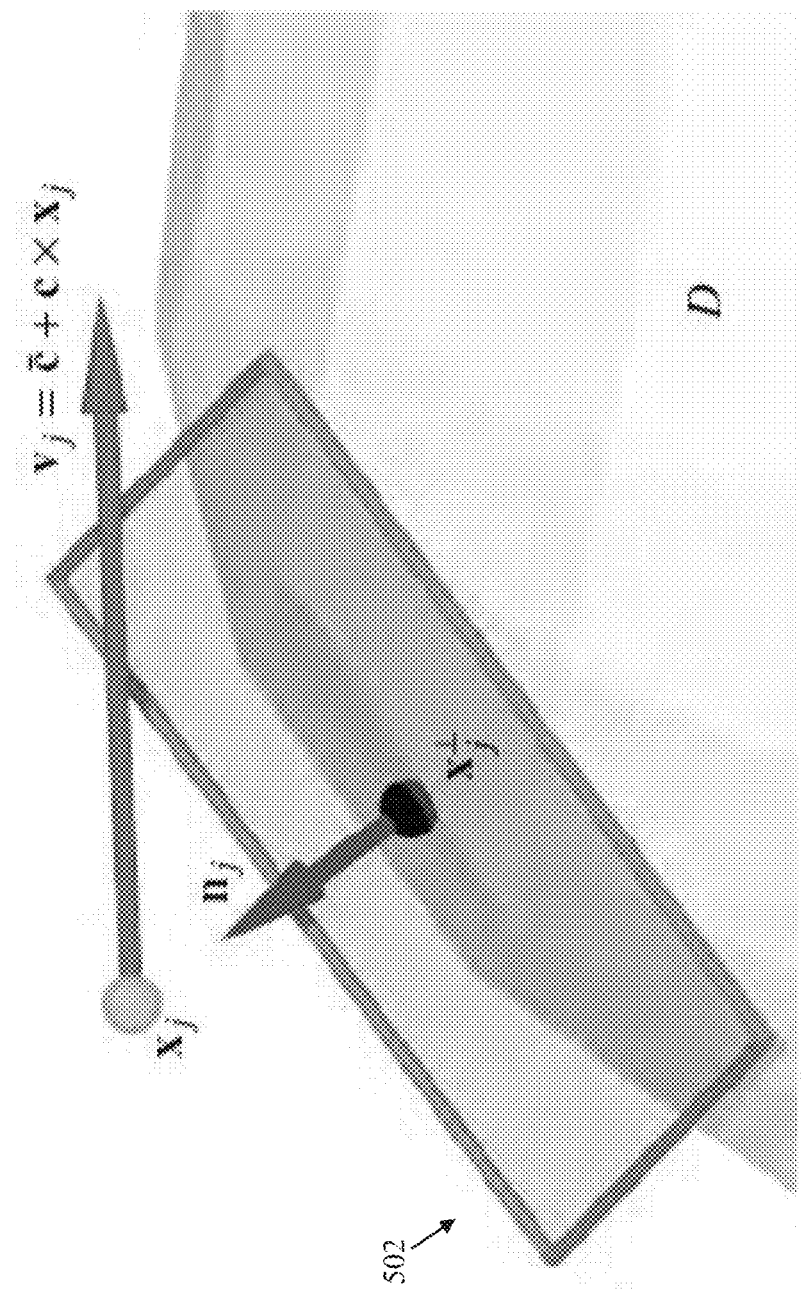
FIG. 5 which is a schematic depicting the process of looking for an instantaneous motion that moves the external points $x_j$ towards D, represented as a tangent plane at its orthogonal projection, in accordance with some embodiments of the present invention.

There are two main objectives: (i) to move as many as possible external spheres into D while (ii) keeping as many as possible internal spheres inside. To achieve (i), the external sphere centers move towards ∂D, where the boundary is, for every point $x_j$, represented by a tangent plane of D at its closest point (aka footpoint) denoted $x_j^\perp$, which is mathematical denoted as:

$$F_E(c, \bar{c}) = \sum_{j=1}^{m} (\langle x_j + c \times x_j + \bar{c}, n_j \rangle + d_j)^2 \quad \text{Equation (2)}$$

Where $d_j = -\langle x_j^\perp, n_j \rangle$, <, > denotes the scalar product, and $n_j$ denotes the boundary normal at the footpoint $x_j^\perp$. Refer to FIG. 5.

Reference is now made to FIG. 5, which is a schematic depicting the process of looking for an instantaneous motion denoted (c, c̄) that moves the external points $x_j$ towards D, represented as a tangent plane (translucent) 502 at its orthogonal projection, denoted $x_j^\perp$, in accordance with some embodiments of the present invention.

The second objective that the internal sphere centers stay inside D is represented by a requirement that the centers move as parallel as possible to ∂D, where the boundary is again represented by tangent planes of corresponding footpoints. This is mathematically denoted as:

$$F_I(c, \bar{c}) = \sum_{j=1}^{n} \langle c \times x_i + \bar{c}, n_i \rangle^2 \quad \text{Equation (3)}$$

The search for the instantaneous motion denoted (c, c̄) gives the following minimization problem, mathematically denoted as:

$$F(c,\bar{c}) = F_I(c,\bar{c}) + wF_E(c,\bar{c}) \to \min \quad \text{Equation (4)}$$

where the weight denoted w controls the importance of the external centers to be brought inside D, relative to the internal points being moved inside D. In examples described herein, w is assumed to be in range 0.1≤w≤0.4.

Equation (4) is a linear least squares problem in (c, c̄) and one therefore needs to solve only a (6×6) linear system. The solution is an instantaneous motion, that can also be interpreted as a vector field (e.g., see 400B of FIG. 4), that moves the centers best (in the least square sense) according to the above described two main objectives. It is noted that moving the centers using this vector field is not sufficient as one would distort the rigidity of the honeycomb structure (as it is only the first order approximation of the rigid body motion).

To keep the structure fully rigid (i.e., to preserve that tangential contact everywhere), a helical motion corresponding to (c, c̄) is applied. The Plucker coordinates, denotes (g, ḡ), of the helical axis denoted G may be computed via the following mathematical expression:

$$g = \frac{c}{\|c\|}, \quad \bar{g} = \frac{\bar{c} - pc}{\|c\|} \quad \text{Equation (5)}$$

where p denotes the pitch of the helical motion, denoted $$p = \frac{c \cdot \bar{c}}{\|c\|},$$

for example, as described with reference to H. Pottmann, S. Leopoldseder, M. Hofer, *Registration without icp*, Computer Vision and Image Understanding 95 (1) (2004) 54-71. The desired helical motion around G is a composition of a rotation by an angle α=arctan‖c‖ and a translation parallel to G by a distance pα.

Reference is now made to FIG. 6, which is an exemplary pseudo code 600 for implementing the first sphere packing process based on "Rigid Body Motion", along with an exemplary sub-routine GetOptHelicalMotion—Optimum helical motion 602, in accordance with some embodiments of the present invention.

Referring now back to FIG. 1, at 104B, the second exemplary sphere packing process is now described. The instances of the sphere are randomly arranged within the interior space of the 3D object representation. At least some of the instances of the sphere may overlap (i.e., the computation of the spheres may be set for allowing overlap of the spheres). The amount of overlap may be predefined. The instances of the sphere are iteratively randomly perturbed, for example, by computing a simulation of "shaking" of the sphere packed 3D object representation. An application of simulated repulsion forces is computed between the instance of the sphere. The simulated repulsion forces are set to repulse spheres with sufficient simulated force for preventing overlap between instances of the sphere. The repulsed spheres may be in tangential contact and/or non-contact with one another.

Each iteration is an attempt to find a better configuration, which is performed by filling the 3D object representation with randomly distributed spheres and letting the spheres spread through D, under simulated repulsion forces.

Reference is now made to FIG. 7, which is an exemplary pseudocode for implementing the second exemplary sphere packing process using randomization and repulsion, in accordance with some embodiments of the present invention.

In Line 1, the pseudo code is for generating an initial, valid honeycomb configuration, for example, using the pseudocode described with reference to the first exemplary sphere packing process. Lines 2-7, include pseudocode for iterating, in a search for a better configuration (one that packs more spheres) until an adjustable termination condition, in Line 2, is met. For example, a certain amount of time having passed. In each iteration, an attempt is made to find a configuration with a greater amount of spheres than the current best one. The configuration resulting from each attempt can either be valid, in which case it is treated as a new best configuration, or invalid, in which case the process continues iterating until the termination condition is met.

The SP1RunAttempt function looks for a new valid configuration with N spheres. The function starts with a random configuration with a desired number of spheres, which satisfies inclusion in D, but not necessarily non-penetration. Then, iterative simulated repulsion forces are applied between the spheres, which makes the spheres spread around in the shape, aiming for the configuration in a nonpenetrating state.

Reference is now made to FIG. 8, which is a pseudocode for implementing the SP1RunAttempt function, which runs a single attempt, in accordance with some embodiments of the present invention.

Line 1 of the pseudocode for implementing the SP1RunAttempt function, is for generating N random sphere centers within D. This can be done, for example, by generating random points within the bounding box of D and filtering out those outside D, until N centers are found. The configuration may be trapped in a local minimum, which could result in an infinite loop. Hence, in Line 2, the pseudocode is for limiting the number of repulsions by the value denoted MaxNumRep.

Reference is also made to FIG. 9, which is a pseudocode for implementing the SP1Repulse function, which relates to a repulsion step, in accordance with some embodiments of the present invention.

In the pseudocode for implementing the SP1Repulse function, for each sphere denoted $s_{new}$ that penetrates other spheres (distance is less than 2r) we move $s_{new}$ away by a fraction of the penetration depth ($0<\alpha<1$). Experiments performed by Inventors have shown that $\alpha \approx 0.5$ may be the best for convergence speed, as higher values create significant oscillations and lower values reduce the rate at which the spheres are spreading throughout D. Note that the spheres are repulsed relative to the old positions of the neighbors, which allows to repulse each sphere in parallel. In Line 8, the code is to make sure that the centers of the spheres never leave the 3D object representation by 'clamping' the result of the repulsion to ∂D. Clamping the position to the closest point in D allows the spheres to 'slide' along ∂D when being pushed out by their neighbors.

Referring now back to 104C of FIG. 1, the third exemplary process for sphere packing may be implemented. The third exemplary process for sphere packing is based on the concept of simulating a shaking of an already valid configuration of spheres inside D in some preferred random directions (e.g., applying simulated 'gravity forces' along these directions). The process may create some free space on the opposite side of D that may be filled with additional new sphere(s). Similarly to the sphere packing using randomization and repulsion process described herein, in the pseudocode for sphere packing using gravity shaking, the pseudocode iterates over the configurations until we the stop condition is met.

An initial arrangement of the instances of the sphere within the interior space of the 3D object representation is computed. A simulation of an external attraction force vector applied in a selected direction externally to the initial arrangement of spheres in the 3D object representation is computed. The simulated external attraction force simulates attraction of the instances of the sphere of the initial arrangement in the selected direction. For example, the simulation may be of gravity, in a direction towards the ground. The simulation of the external attraction force causes the spheres of the initial arrangement to become more packed, creating open spaces. Additional instances of the sphere are placed in the open spaces to create another arrangement of the instances of the sphere. The process may be iterated, for example, by applying the external attraction force in different directions, such as until no additional empty spaces large enough to accommodate additional spheres are created.

Reference is also made to FIG. 10, which is a pseudocode for implementing a third exemplary process for sphere packing by simulation of gravity shaking, in accordance with some embodiments of the present invention.

The term gravity may be substituted with the term attraction force, relating to simulation of an external attraction force in an arbitrary direction. Gravity is used to help conceptually understand the attraction forces, but it to be understood that the simulated forces do not necessarily simulate gravity, for example, having an attraction force value different than that of gravity and an attraction direction vector different than gravity.

Reference is also made to FIG. 11, which is a pseudocode for implementing the SP2ApplyRandomGravit function for simulating application of random gravity, in accordance with some embodiments of the present invention.

On each iteration of the pseudocode for implementing the SP2ApplyRandomGravit function, the code is for pushing all the spheres along one random direction denoted $\vec{g}$, as much as possible, in an attempt to free up some space in the opposite direction.

For the three exemplary sphere packing processes described herein, mutual non-penetration of the spheres may be validated, and the closest points on ∂D may be computed, to ensure inclusion. When D is formed by a polygonal border, this query may be answered by finding the closest points top on each polygon and then choosing the closest one among them. As descried herein, optimizations may be possible to avoid the examination of all polygons, every time.

The idea is similar for shapes formed by freeform surfaces instead of polygons: the closest point on each surface patch may be found and then the closest one among them may be selected. For each parametric surface patch denoted s(u, v), assuming it is $C^1$ continuous, there are three possibilities for the location of the closest point. The first possibility is in the interior of the surface itself, at some point denoted s(û, v̂) where the tangent plane of the surface is orthogonal to the vector denoted p−s(û, v̂), i.e., mathematically represented as:

$$\left\langle p - s(\hat{u}, \hat{v}), \frac{\partial s}{\partial u}(\hat{u}, \hat{v}) \right\rangle = 0, \quad \left\langle p - s(\hat{u}, \hat{v}), \frac{\partial s}{\partial v}(\hat{u}, \hat{v}) \right\rangle = 0 \qquad \text{Equation (6)}$$

The second possibility of distance extrema is on the boundary of the patch, formed by four curves $c_j(t)$, at some point denoted $c_j(\hat{t})$ where the tangent of the curve is orthogonal to the vector denoted $p-c_j(\hat{t})$, i.e., mathematically represented as:

$$\langle p-c_j(\hat{t}), c'_j(\hat{t})\rangle = 0, j=1, \ldots, 4 \qquad \text{Equation (7)}$$

Equations (6) and/or (7) may be solved, for example, using a solver such as described with reference to G. Elber, M.-S. Kim, *Geometric constraint solver using multivariate rational spline functions*, in: *Proceedings of the sixth ACM symposium on Solid modeling and applications*, ACM, 2001, pp. 1-10. The final possibility one should examine for the closest point is at the four corners of the patch.

The repulsion process described herein tries to push spheres by a fraction of their penetration depth on each step, effectively reducing the penetration depth inverse-exponentially, whenever possible. Such behavior means that reaching zero penetration depth would take infinite number of repulsions, or, when dealing with floating-point numbers, be a matter of floating-point precision errors. Since checking for zero penetration depth is fundamental in the configuration's validity check, this check may be made with a certain degree of tolerance (e.g., denoted epsilon). The choice of the exact tolerance may be task-specific, optionally, selected as high as the task allows, since increasing this tolerance would reduce the number of repulsion steps needed to accept a configuration as valid, and thus speed-up the whole process. Specifically, for truss structures, this accuracy need not be very tight, for example, due to inaccuracies of the manufacturing process which may be larger than the computational inaccuracies.

Finding the sphere's neighbors and finding the closest point on $\partial D$, are two tasks that are solved numerous times, in both exemplary sphere packing processes described herein. Optimization of these two tasks may be performed to improve computational efficiency of a computer implementing the respective process. A naive process for finding the neighbors of a single sphere would involve checking all other spheres and returning those with positive penetration depth. This naive process runs in linear time, traversing all other spheres. A constant time process may be implemented which involves a bounding volume hierarchy (BVH) or a partitioning of the space around D into a uniform grid with each grid cell tracking which spheres are currently inside of it. Such process may be applied for optimizing the process of finding the closest point on $\partial D$. For example, when the shape is polygonal, a uniform grid may be pre-built, with each grid cell knowing a small subset of polygons that is guaranteed to contain the closest point to any point within the cell.

The repulsion process may be parallelized. Within each repulsion step each sphere may be processed in parallel as it does not modify any memory besides the sphere's new position. A high performance parallel implementation is therefore possible, depending on the shape border type. Separate independent attempts may also be run in parallel, allowing a larger-scale parallelization.

The gravity algorithm may be parallelized using another approach. Whenever a new improved configuration is found (or within fixed time intervals), it is possible to run several independent instances of gravity shaking process branched from the current best one (each with its own random seed for a direction ~g). One of these instances may succeed faster or better than the others, thus improving the overall performance.

Another routine that is called frequently in the rigid body motion sphere packing process described herein is the computation of footpoints on a mesh $\partial D$ and then the subsequent estimation of the normal vectors. Depending on the location of the footpoint (vertex, edge, or face), the normal vector is computed accordingly (e.g., in the case of a vertex by weighted averaging the normal vectors of the surrounding faces, the weights being the areas of the faces). This task may be the bottleneck of the rigid body process and may be parallelized by processing every point (a sphere center) in a separate thread. Such a parallelization gave a speed-up of (almost) the number of threads. The process performance could possibly be further improved by considering a better initial honeycomb configuration. The initial configuration may be built without considering rotations of the honeycomb with respect to D.

Referring now back to FIG. 1, at 106, nodes of a truss for the 3D object representation are computed. Each respective node may be positioned at a center of each respective instance of each sphere of the packed sphere arrangement. The nodes may be selected to be smaller than the spheres, for example, a fixed common size, such as a radius of 10%-50% of the radius of the sphere, or about 20%-40%, or other values.

At 108, beams of the truss are computed. The adjacent nodes are connected with respective beams. The length of the beams may correspond to the radius of each sphere. The node is located at the center of the sphere, and the beams extend from the node to the boundary defined by the sphere.

The beams of the truss may have a common length corresponding to the common radius of the instances of the sphere. Alternatively, beams may have different lengths, each length corresponding to the respective radius of the respective sphere.

The attachment of beams between adjacent nodes may be based on a set of rules. For example, adjacent nodes spaced apart by a distance below a threshold are connected by a respective beam. Adjacent nodes spaced apart by a distance above the threshold are not connected by a respective beam. The set of rules may provide optimal beam connections between nodes, by reducing the total number of beams while providing strength, by connecting nearby nodes and avoiding connections between nodes that are far apart (which would increase the total number of beams and/or provide structurally weak connections due to the long length of the beams).

In another example, the set of rules may define connection of beams between nodes according to an angle formed between nodes. A set of three adjacent nodes form an angle defined by a first straight line defined by a first and second node and by a second straight line defined by the first and a third node. The set of beams may be connected when the angle is equal to sixty degrees and within a tolerance range (e.g., +/−5-10 degrees or other values). When the angle is external to the tolerance range (e.g., greater and/or lower than about 60 degrees) the set is not connected by beams.

Optionally, a radius denoting thickness of each respective beam (i.e., for a beam with a round cross section) may vary according to analysis and/or optimization, and/or location, of the respective beam within the 3D object representation. For example, beams bearing more weight (e.g., at the bottom) may be thicker for added strength in comparison to beams that bear less weight (e.g., at the top).

At 110, features described with reference to 104-108 may be iterated. During each iteration one or more of the following values may be adjusted to create an updated truss: an adjusted value for the common radius of the instances of the sphere, an adjusted value for a common size and/or shape for the nodes of the truss, and an adjusted value for a common size and/or shape for the beams of the truss. It is noted that when non-common values are used, different values may be adjusted in different combinations.

Additional details regarding creation of the lattice are now provided. The connectivity of the lattice is computed based on the sphere packing of the interior of the 3D object representation. The lattice is computed according to the connectivity. The lattice may be constructed from nodes implemented as a sphere (smaller than the spheres packed into the 3D object representation, while sharing the same center), and the half-beams that exit from it (for an example, see FIG. 12).

Figure 12:
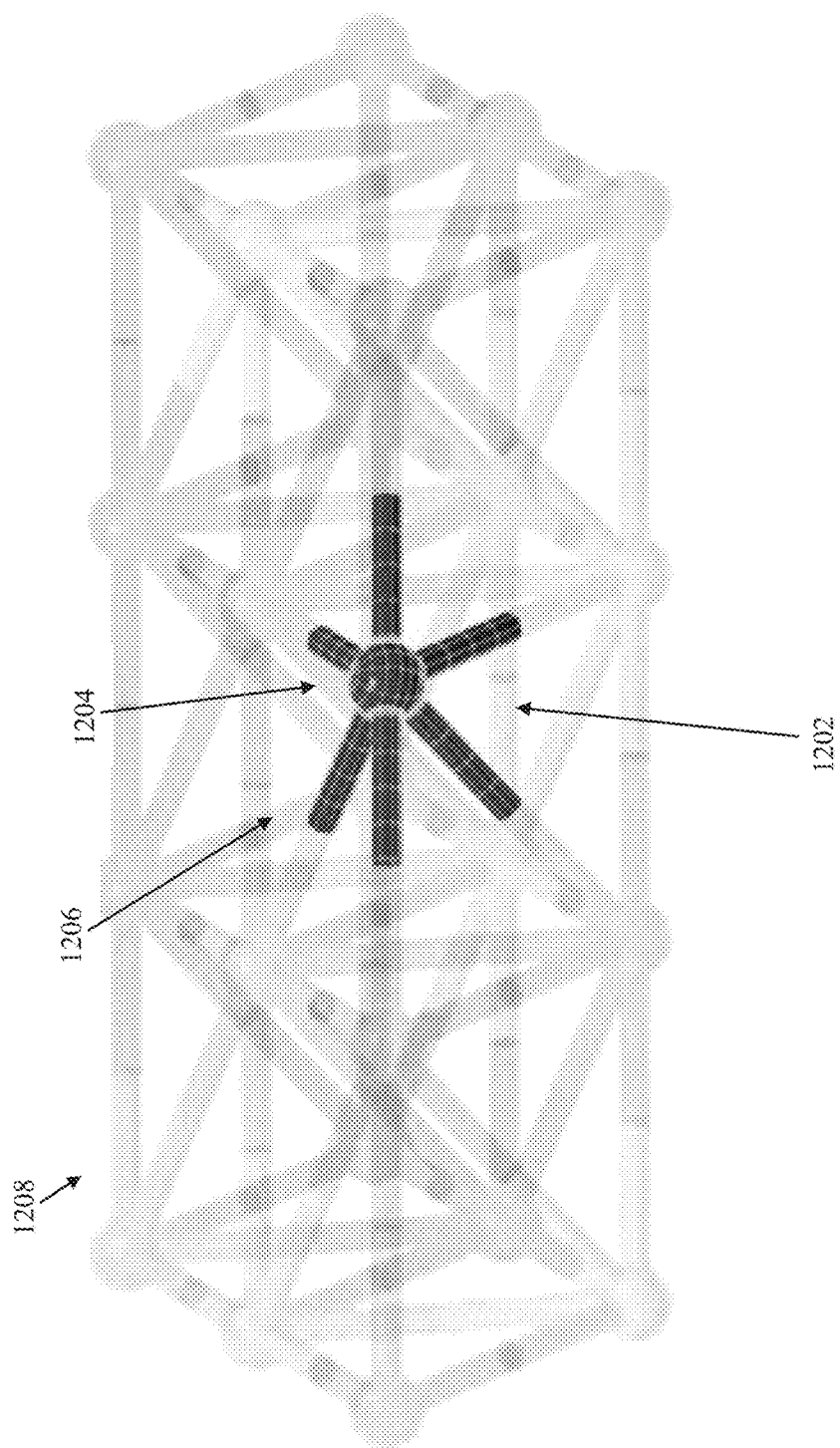
FIG. 12 is a schematic depicting a node, including a sphere and half-beams (in opaque dark blue), shown as part of a (translucent) truss lattice, in accordance with some embodiments of the present invention.

Reference is also made to FIG. 12, which is a schematic depicting a node 1202, including a sphere 1204 and half-beams 1206 (in opaque dark blue), shown as part of a (translucent) truss lattice 1208, in accordance with some embodiments of the present invention.

Each half-beam 1206 forms half the length of the connection between two adjacent sphere centers 1204, denoted $P_i$, $P_j$, representing all the geometry associated with $P_i$ independently from other points. The following are exemplary parameters for computing the lattice 1208 (some of which are optional):

$d^{connect}$—the threshold for connecting two nodes. When the sphere packing process packs spheres of radius r, then $d^{connect} \geq 2r$.

$r^{sphere}$—the radius of the spheres at the center of the lattice nodes.

$r^{beam}$—the beam radius.

$r^{fillet}$—the filleting radius.

$h^{fillet}$—the filleting height.

Reference is also made to FIG. 13, which is a pseudocode for implementing an exemplary process for computing the lattice, in accordance with some embodiments of the present invention.

Reference is also made to FIG. 14, which is a pseudocode for implementing an exemplary process for computing a single node, in accordance with some embodiments of the present invention.

Figure 15:
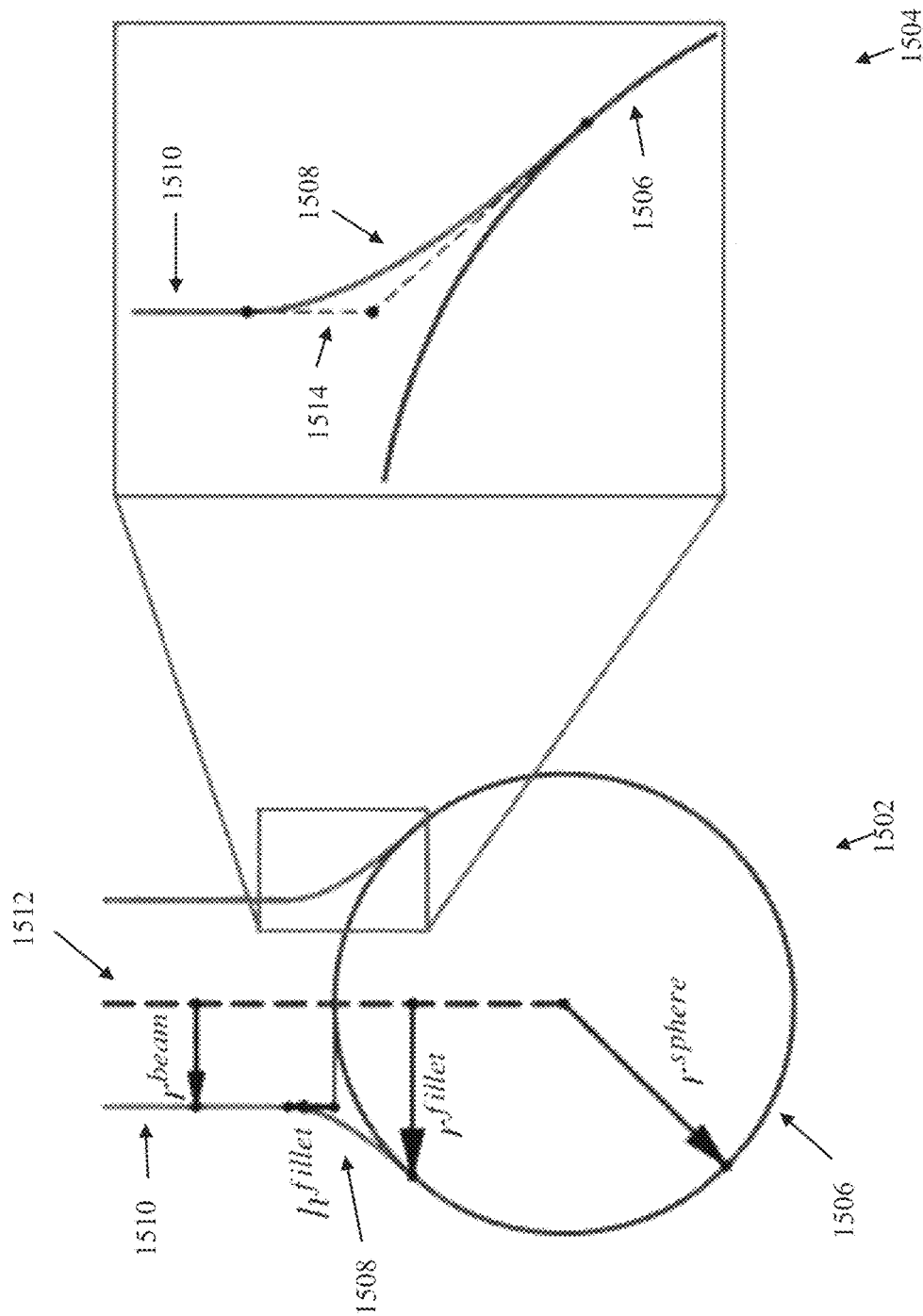
FIG. 15 is a schematic depicting a cross-section of components of a node with one half-beam, in accordance with some embodiments of the present invention.

Reference is also made to FIG. 15, which is a schematic depicting a cross-section of components of a node with one half-beam, in accordance with some embodiments of the present invention.

At 1502 a sphere 1506 (dark red), a filleting 1508 (green), a cylindrical half-beam 1510 (light blue), and an axis of the half-beam 1512 (dashed gray) are shown. At 504, a zoomed-in view of the filleting 1508 between the sphere 1506 and the half-beam 1512 is depicted. The control polygon of the filleting 1514 (dashed gray) indicates that the quadratic filleting is tangent both to the sphere and the half-beam.

It is noted that the fillet is an optional component.

The parameters $r^{fillet}$ and $h^{fillet}$ together govern the computed rounding between the spheres at the centers of the nodes, and the beams in the node. The following conditions may be met: $r^{sphere} < r^{fillet} < r^{beam}$.

Given a packing of spheres of radius r, two lattice nodes, denoted $P_i$, $P_j$, may be connected by a beam, when $|P_i - P_j| \leq d^{connect}$. Since for all but the most trivial models, the sphere packing is not necessarily a perfect fcc or hcp packing, an exemplary value is $d^{connect} = 2r\sqrt{2}$. This heuristic stems from the likelihood that when four spheres are arranged (approximately) in a planar quadrilateral, a beam may be formed from only one of the diagonals.

Next, a check may be performed to determine when any of the beams (which do not share a node) intersect each other, for example by checking distances between two line segments in 3D (the axes of the two beams). Since the thickness of each beam is bounded by $r^{fillet}$, it may be determined that when the distance between the axes of the beams is greater than $2r^{fillet}$, then they do not intersect. When they do intersect, the longer beams may be filtered out (Lines 2-9 of the lattice constructions pseudocode described with reference to FIG. 13).

With the connectivity of the truss lattice determined, all the topological information needed to construct each node unit may be available. An exemplary construction process is described by the pseudocode for constructing a single node. Each node may be constructed from a sphere denoted $S_i$, and a set of halfbeams denoted $\{C_{i,k}\}$. The half-beams may be constructed by creating a profile curve which includes a filleting part which is tangent to the sphere, and a linear part, only to construct a surface of revolution from the profile curve. For an illustration of the construction of the profile curve, recall FIG. 15.

Figure 16:
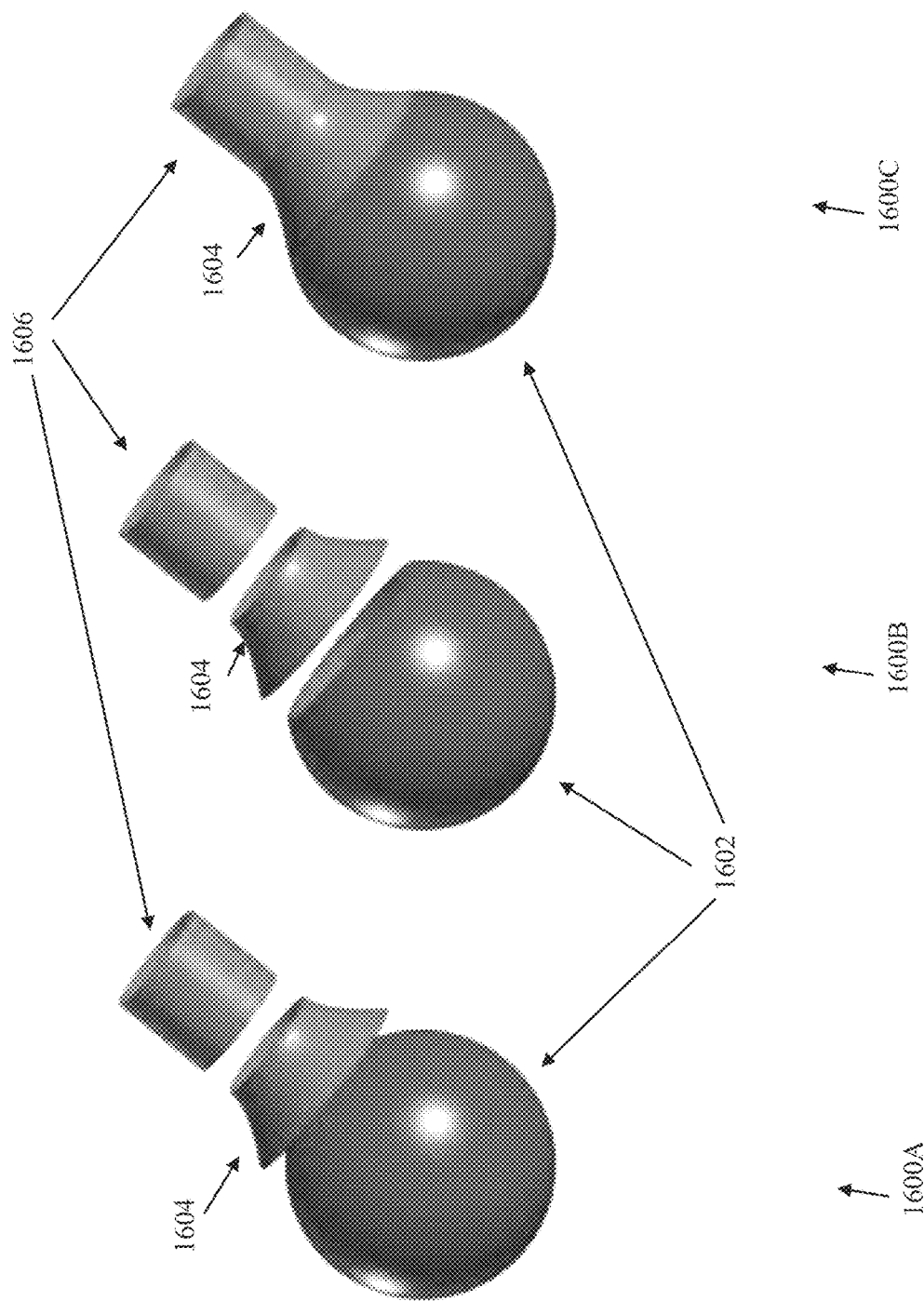
FIG. 16 is a schematic depicting three components of a node with one beam, in accordance with some embodiments of the present invention.

Reference is also made to FIG. 16, which is a schematic depicting three components of a node with one beam, in accordance with some embodiments of the present invention. A sphere 1602 (in red), a filleting 1604 (in green), and a beam 1606 (in blue), are depicted. Magenta indicates the reverse side of the surfaces. 1600A shows an exploded view of the three components, before clipping the sphere. 1600B presents an exploded view of the components, after clipping the sphere. Finally, 1600C is the assembled node.

The central sphere of the node may be clipped by planes which form the bases of the beams, to form a trimmed surface. Each half-beam, at sphere center denoted $P_i$, $C_{i,k}$, may be clipped at the contours of its intersections with all other half-beams denoted $C_{i,m}$ (when such intersections exist). When the shapes ($r^{beam}$, $r^{fillet}$, $h^{fillet}$) of all the half-beams are the same, then the intersection curve is planar, and the clipping of the half-beams may be efficiently computed by finding the plane that bisects $C_{i,k}$, $C_{i,m}$, and clipping $C_{i,k}$, $C_{i,m}$ against that plane. When the shapes of the beams are not the same, the clipping may be performed by computing full surface-surface intersections.

Figure 17:
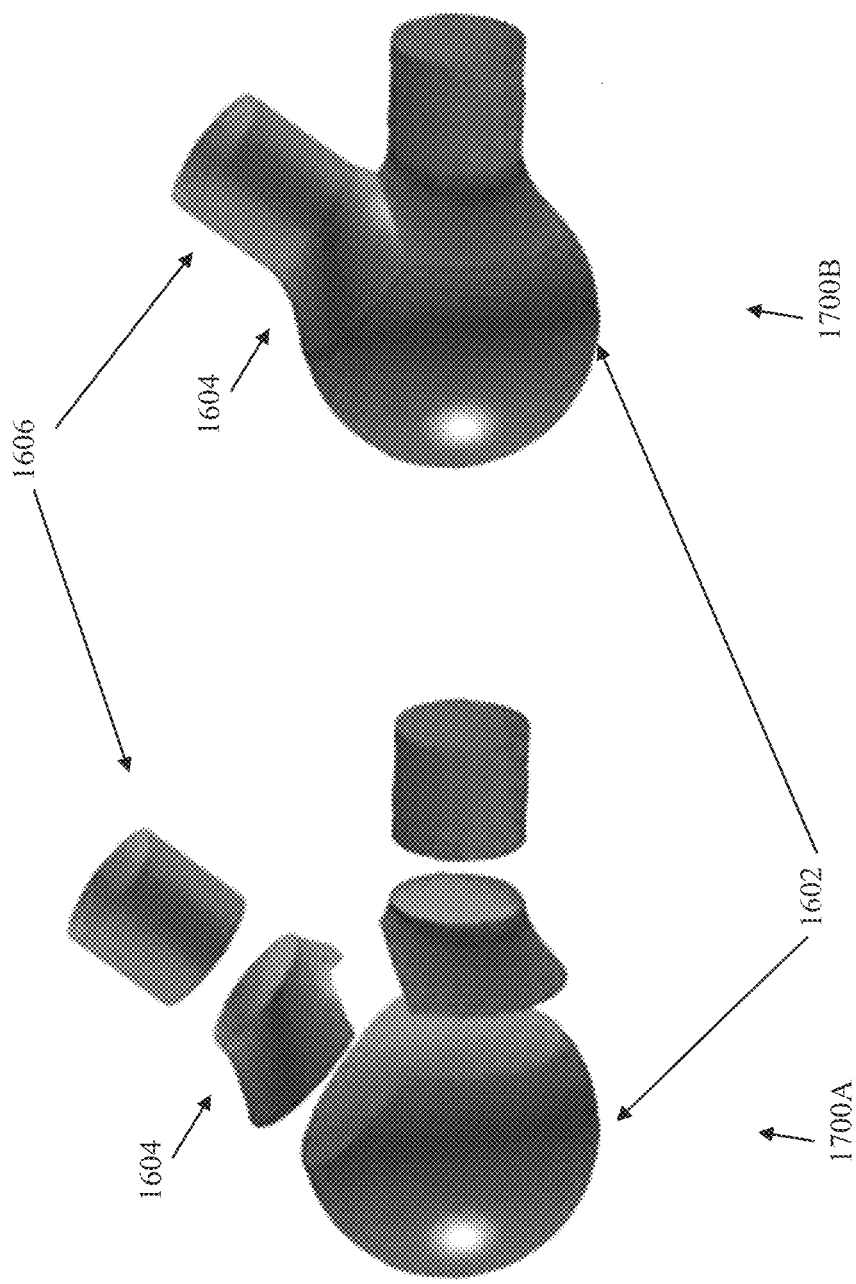
FIG. 17 is a schematic depicting clipping of the intersecting beams, in accordance with some embodiments of the present invention.

Reference is now made to FIG. 17, which is a schematic depicting clipping of the intersecting beams, in accordance with some embodiments of the present invention. The coding is the same as in FIG. 16. An exploded view of a node 1700A with the clipped sphere 1602 and two (clipped) intersecting half-beams 1606 is shown. An assembled node 1700B is shown.

The resulting lattice may be constructed as a collection of biquadratic rational (trimmed) B-spline surfaces. Each node may include a trimmed spherical surface, and half-beams that are (possibly) trimmed surfaces of revolution.

Additional features for the construction of truss lattice are now described, including an exemplary process for connecting the boundary shell of a freeform model to a supporting truss lattice, and an exemplary process for generating a tensor-product trivariate volumetric representation of the truss lattice, for example, towards (isogeometric) analysis.

At 112, the truss lattice may be connected to a boundary shell of the 3D object representation. Some features described with reference to FIG. 1 may be adapted in order to enable connection of the boundary shell to the truss. The boundary shell may be computed for the 3D object representation (e.g., in 102). The spheres may be arranged (e.g., packed) within the interior space of the boundary shell, to create the packed sphere arrangement (e.g., in 104). Nodes of the truss may be computed, where each respective node is positioned at a center of each respective instance of each sphere of the packed sphere arrangement (e.g., in 106). Beams are computed (e.g., as in 108) to connect between nodes of the packed sphere arrangements that are closest to the inner surface of the boundary shell, and points (e.g., locations) on the inner surface of the boundary shell that are closest to each respective node closest to the inner surface of the boundary shell. The computation of the beams connects the truss to the boundary shell.

One exemplary application of the truss lattice is supporting the weight of other structures. An exemplary process for constructing a shell supported by a truss lattice, from a B-rep freeform model, is now described.

The B-rep of the shell is obtained, for example, supplied by the user, and/or computed from a B-rep of the 3D object model. When the shell is not supplied, an offset of the 3D object may be computed, to create the interior-side of the B-rep of the shell. Given a $G^1$ continuous surface denoted $S(u, v)$, it may be assumed that its normal field, denoted $N^S(u, v)$, is oriented so that it points to the interior of S. The offset surface denoted $S^{Offset}(u, v)$ may be defined as $S^{Offset}(u, v) = S(u, v) + \alpha \overline{N^S}(u, v)$ where $\overline{N^S}(u, v)$ denotes the unit normal field, and $\alpha$ denotes the offset amount—a parameter which controls the thickness of the shell. The computation of the precise offset surface may be a complex task, for example, being represented as a polynomial or rational surface. Any algorithm for approximating an offset surface may be used, for example, as described with reference to X. Xiduo, L. Jijun, Z. Hong, *A new NURBS offset curves and surfaces algorithm based on different geometry shape*, in: 2009 *IEEE 10th International Conference on Computer-Aided Industrial Design & Conceptual Design, IEEE*, 2009, pp. 2384-2390. A sphere packing process is applied to the inner offset surface, and, as in the truss computation process described herein, take the centers of the spheres, denoted $\mathcal{P} = \{P_i\}$, as the positions of the lattice nodes. Additionally, for each $P_i \in \mathcal{P}$, the nearest point denoted $Q_i$ may be computed on $S^{Offset}$. Each $Q_i$ for which $|P_i - Q_i| < d^{connect}$ may be used to connect $S^{Offset}$ to $P_i$.

The connection of the node $P_i$ to the shell may be done by intersecting $S^{Offset}$ with a cylinder with $P_i - Q_i$ as its axis, and a radius of $r^{fillet}$. The cylinder may be positioned to ensure that its intersection with $S^{Offset}$ forms a closed loop. The intersection contour, denoted $c^S$, may form one of the rails of the fillet, and also it may be trimmed out of $S^{Offset}$. The other rail of the fillet may be a circle, denoted $c^T$, of radius denoted $r^{beam}$, which is on a plane perpendicular to $P_i - Q_i$, and positioned $h^{fillet}$ above $S^{Offset}$ (along the $P_i - Q_i$ direction). The middle curve of this quadratic fillet may be determined to ensure $G^1$ continuity with both $S^{Offset}$ and the beam (which is yet to be constructed). An optional filleting surface may be constructed between $c^S$ and $c^T$. Finally, a virtual neighbor, $Q_i'$, is assigned to $P_i$ at $Q_i' = P_i + 2(\text{Center}(c^T) - P_i)$, so that the lattice constructions process described herein connects the node $P_i$ to the circle $c^T$ by a half-beam.

Figure 18:
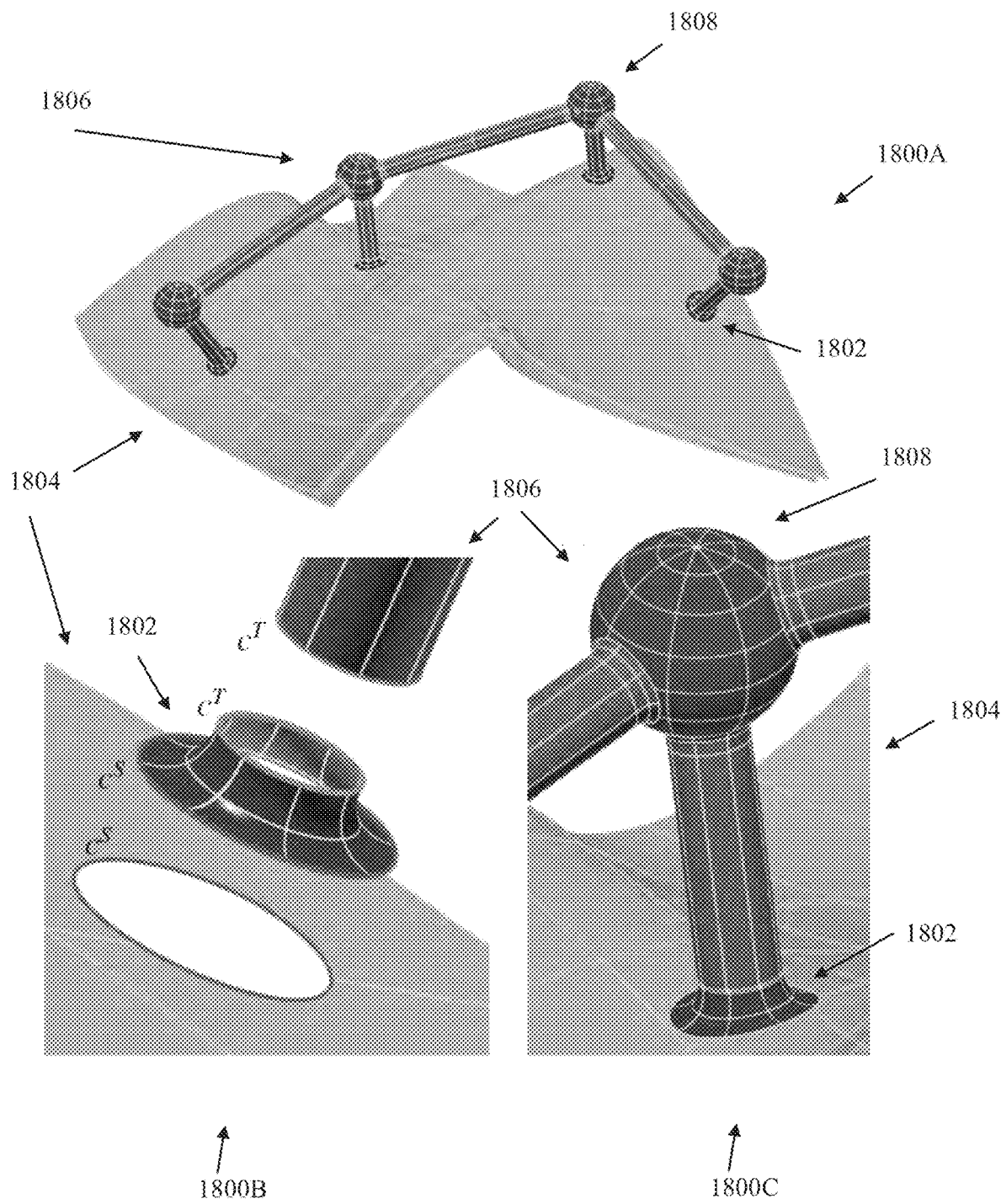
FIG. 18 is a schematic depicting a fillet for connecting a shell to a lattice, in accordance with some embodiments of the present invention.

Reference is also made to FIG. 18, which is a schematic depicting a fillet 1802 for connecting a shell 1804 to a lattice 1806, in accordance with some embodiments of the present invention.

FIG. 18 depicts three views of a configuration of four nodes (red) 1808 connected to shell 1804, denoted S–$S^{Offset}$ (light blue), by beams (green). 1800A depicts the entire configuration. 1800B depicts an exploded view of the connection between the shell and a beam 1810 of lattice 1806 by fillet 1802 (dark blue), with the fillet rails denoted $c^T$ (tan) and $c^S$ (red). 1800C depicts a zoomed-in view of an assembled node, connected to the shell 1804 by filleted 1802 beams 1810 with $G^1$ continuity.

Reference is now made to FIG. 19, which is an exemplary pseudocode for connecting the lattice to the shell, in accordance with some embodiments of the present invention.

The lattice construction processes may be implemented using a (trimmed) B-spline surface boundary representation of the 3D object representation geometry. A process for converting the lattice structure constructed by the exemplary process described herein, to a tensor-product trivariate B-spline representation, which may be used to provide an (isogeometric) analysis-ready representation, is now described.

Referring now back to FIG. 1, at 114, the (optionally trimmed) B-spline truss lattice may be converted to a tensor-product trivariate model. Some features described with reference to FIG. 1 may be adapted in order to enable conversion of the (optionally trimmed) B-spline truss lattice to the tensor-product trivariate model. The 3D object representation may be represented as the B-spline surface boundary representation (e.g., in 102). Nodes of the truss may be computed, where each respective node is positioned at a center of each respective instance of each sphere of the packed sphere arrangement (e.g., in 106). Beams of the truss may be computed by connecting adjacent nodes with respective beams (e.g., in 108). A complete representation of a boundary surface of each node and a half of each beam connected to each node may be computed, by computing interior surfaces which separate each half of each beam from the respective node and from other beams and computing caps for each half of each beam. The boundary surfaces of the nodes and corresponding half of each beam of the truss may be represented as trimmed B-spline surfaces. The boundary surfaces of the nodes and corresponding half of each beam of the truss may be converted to tensor-product B-spline surfaces.

B-spline trivariates may be computed by constructing ruled trivariates between the untrimmed surfaces from each respective node and corresponding half of each beam and kernel points represented as degenerate surfaces. For surfaces of the node, the kernel point may be represented as the center of the corresponding node. For each half of each beam ruled trivariates may be constructed between boundary surfaces that form the respective half of each beam include a base cap, a top cap and separating surface, where the kernel point is selected near the base cap.

Since some implementations of the exemplary process described herein for generating the lattice structure are designed to produce a closed B-rep model with a hollowed interior, a complete representation of the boundary surfaces of the node and of each half-beam is generated. This may be computed by constructing the interior surfaces which separate the half-beams from the sphere and from other beams, as well as the caps of the half-beams. The boundary surfaces of the node are denoted $S(u, v)$, as described herein with respect to the exemplary pseudocode for constructing a single node, which is a sphere with parts of it trimmed out (see Line 7 thereof), and the bases of the half-beams. The boundary surfaces of each half-beam are denoted $C_{i,k}$ (as described with reference to pseudocode for constructing a single node), the base and top caps of the half-beam, and, when $C_{i,k}$ intersects with any other half-beams denoted $C_{i,m}$ the boundary surfaces at which $C_{i,k}$ was clipped (in Line 12 thereof).

Figure 20:
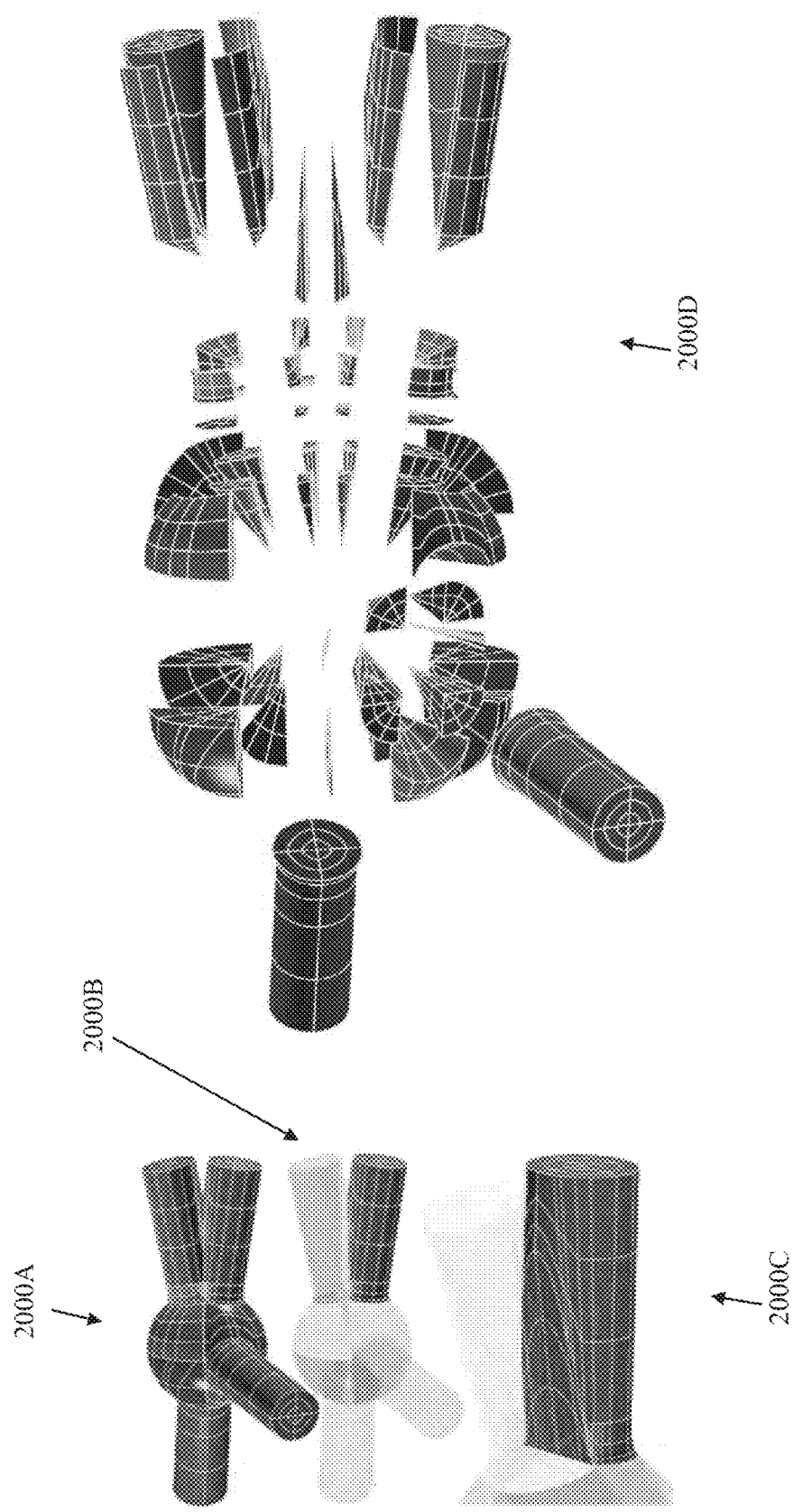
FIG. 20 is a schematic depicting an example of the boundary surfaces of a half-beam of a trivariate node, in accordance with some embodiments of the present invention.

Reference is now made to FIG. 20, which is a schematic depicting an example of the boundary surfaces of a half-beam, in accordance with some embodiments of the present invention.

FIG. 20 depicts the boundary surfaces of a beam for constructing a trivariate model. 2000A depicts a node with four half-beams, two of them mutually intersect (green), while the other are intersection-free (blue). The seemingly-irregular parameterization of the sphere is due to untrimming. 2000B depicts boundary surfaces of a beam (opaque) and 2000C depicts its zoomed-in image; the planar section separating the beam from its neighbor is shown in teal. 2000D depicts an exploded view. The components of the central node are shown in shades of red. The components of the trimmed (and untrimmed) half-beams are shown using the colors: the outer boundary of the half-beams (green), with the top caps (purple), the base caps (bright blue), the separating surfaces between the half-beams (teal), and the non-trimmed half-beams (light blue).

The computed boundary surfaces of the node and half-beams are converted (if trimmed) from trimmed B-spline surfaces to tensor-product B-spline surfaces, using a suitable process, for example, as described with reference to F. Massarwi, B. van Sosin, G. Elber, *Untrimming: Precise conversion of trimmed-surfaces to tensor-product surfaces*, Computers & Graphics 70 (2018) 80-91. The B-spline trivariates may be obtained by constructing ruled trivariates between the untrimmed surfaces that form the node (the sphere and the half-beams), and kernel points (represented as degenerate surfaces). For the surfaces of the sphere, the kernel point is defined by the center of the sphere. For each half-beam, ruled trivariates may be constructed between the boundary surfaces that form the half-beam (i.e., the half-beam as described with reference to the process for construing a single node, and the base, the top cap, and the separating surfaces, as shown with respect to FIG. 20) and a kernel point defined inside the half-beam. This kernel point may be selected near the base, to guarantee that the lines connecting the kernel point and the boundary surfaces of the half-beam are all contained inside the half-beam, ensuring that the Jacobians of the constructed trivariates are strictly positive in their interior (i.e., the trivariates may have singularities on their boundaries, which is considered tolerable in isogeometric analysis applications).

A special, but simpler, case for constructing the trivariate representations of the half-beams is now described. Such case occurs when a half-beam does not intersect with any other half-beam. In this case, the half-beam denoted $C_{i,k}$ is not clipped as described with reference to the exemplary process for constructing a single node, and therefore may be constructed as a single ruled tensor-product trivariate between $C_{i,k}$ and a line going along the axis of the half-beam. In the experiments performed by Inventors described in the Examples section below, tensor-product half-beam surfaces were a very common case. In the duck model in 2300D of FIG. 22, 4759 out of 12932 half-beams were tensor-products. For a comparison, see the exploded view of the node in 2000D of FIG. 20: the two tensor-product half-beam trivariates appear in light blue, and the components of the half-beams that were trimmed and then untrimmed appear in shades of green, purple, teal and bright blue.

Reference is now made to FIG. 21, which is an exemplary pseudocode for trivariate node construction, in accordance with some embodiments of the present invention. The exemplary pseudocode for trivariate node construction generates non-overlapping trivariates, and without gaps between the trivariates. This, in addition to the guarantee that the Jacobian of the trivariates is non-negative (and strictly positive in the interior), allows precise integration operations over the entire truss lattice.

Referring now back to FIG. 1, at 116, code instructions for execution by a manufacturing device controller of a manufacturing device for manufacturing the truss may be generated.

Optionally, the manufacturing device is an additive manufacturing device, and the code instructions are for additive manufacturing of the truss.

Alternatively or additionally, the code instructions are for manufacturing of a set of beams having a common size and/or shape and a set of nodes having a common size and/or shape. Instructions for assembling the set of beams and set of nodes into the truss may be generated.

At 118, the truss is manufactured by the manufacturing device, by a controller executing the code instructions.

Various embodiments and aspects of the present invention as delineated hereinabove and as claimed in the claims section below find experimental and/or computational support in the following examples.

EXAMPLES

Reference is now made to the following examples, which together with the above descriptions illustrate at least some implementations of systems, methods, apparatus, and/or code instructions described herein.

Inventors tested at least some implementations of systems, methods, apparatus, and/or code instructions described herein on several models, including B-spline and/or polygonal. The graphic results are described, along with an analysis of the quality of the resulting lattices and the performance of the exemplary sphere packing processes described herein.

A duck model, shown in FIG. 4, is a B-spline surface of orders 3×4 with 24×17 control points, and its outward dimensions are 2.3×1×1.1.

Figure 22:
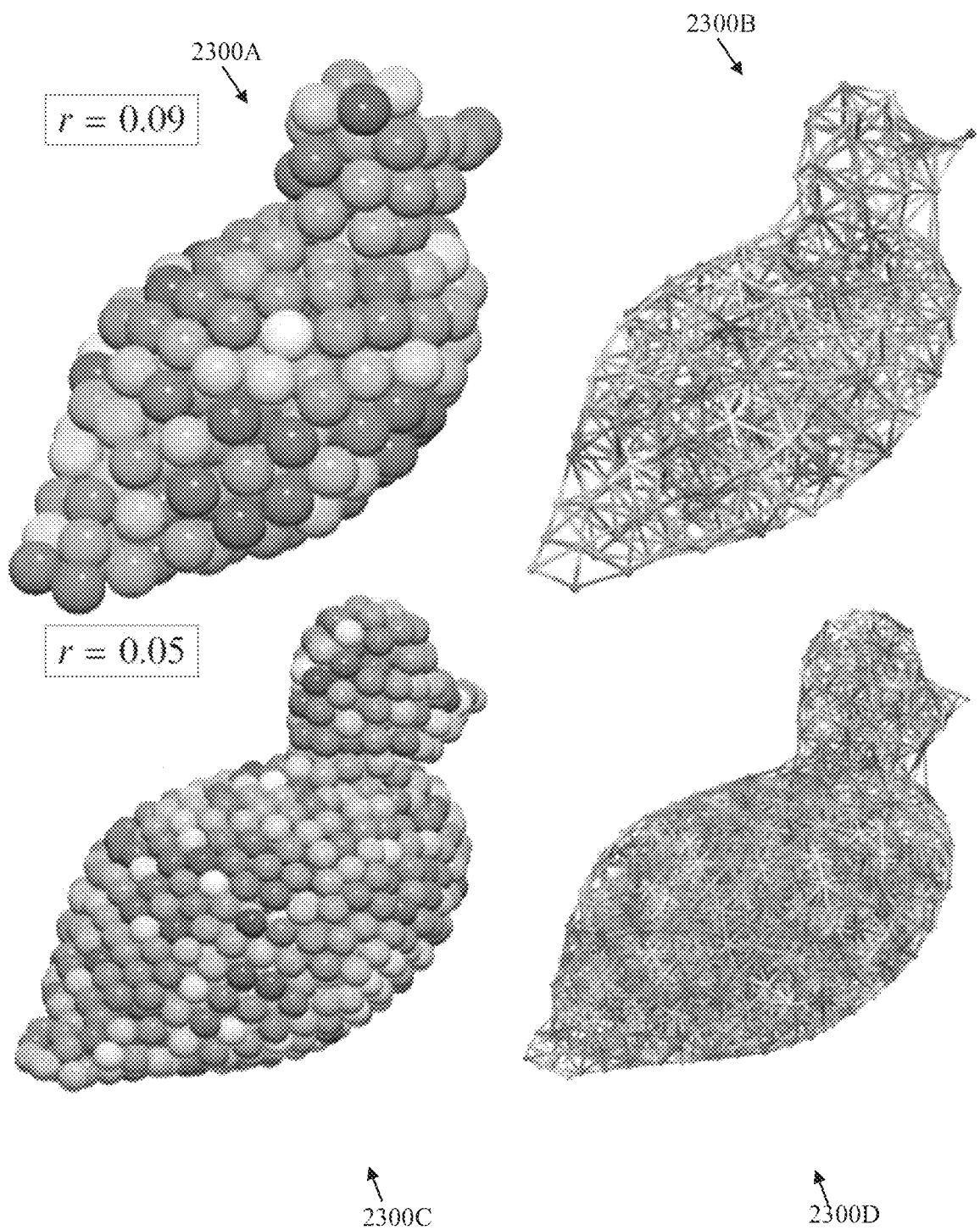
FIG. 22 is a schematic depicting results for sphere packing and truss construction for the duck model, in accordance with some embodiments of the present invention.

Reference is now made to FIG. 22, which is a schematic depicting results for sphere packing and truss construction for the duck model, in accordance with some embodiments of the present invention. At 2300A the sphere packing results with 230 spheres of r=0.09 and at 2300B the associated truss lattice. At 2300C and 2300D the analogous layout for r=0.05. The exemplary sphere packing process using gravity shaking was used to compute two packing of its interior: one with 230 spheres of radius 0.09 (shown in FIG. 22 by call out numbers 2300A and 2300B), and the other with 1067 spheres of radius 0.05 (shown in FIG. 22 with call out numbers 2300C and 2300D). The two sphere packings demonstrate that a finer packing (greater number of spheres of smaller radius) better captures the surface details of the model, such as the smooth surfaces of the head and back of the duck. Such control over the sphere radius has implications beyond the geometry, such as stress behavior.

In another example, Inventors created a modified version of the Stanford bunny, since the original Stanford bunny has holes in the bottom, being unsuitable for sphere packing. The original Stanford bunny may be obtained, for example, with reference to https://www(dot)thingiverse(dot)com/thing:3731/files. The Stanford bunny is a polygonal model with outward dimensions of 1.7×1.2×1.6. The exemplary sphere packing process using randomization and repulsion was used to pack the adapted bunny with spheres of radius 0.06, resulting in 885 spheres.

Figure 23:
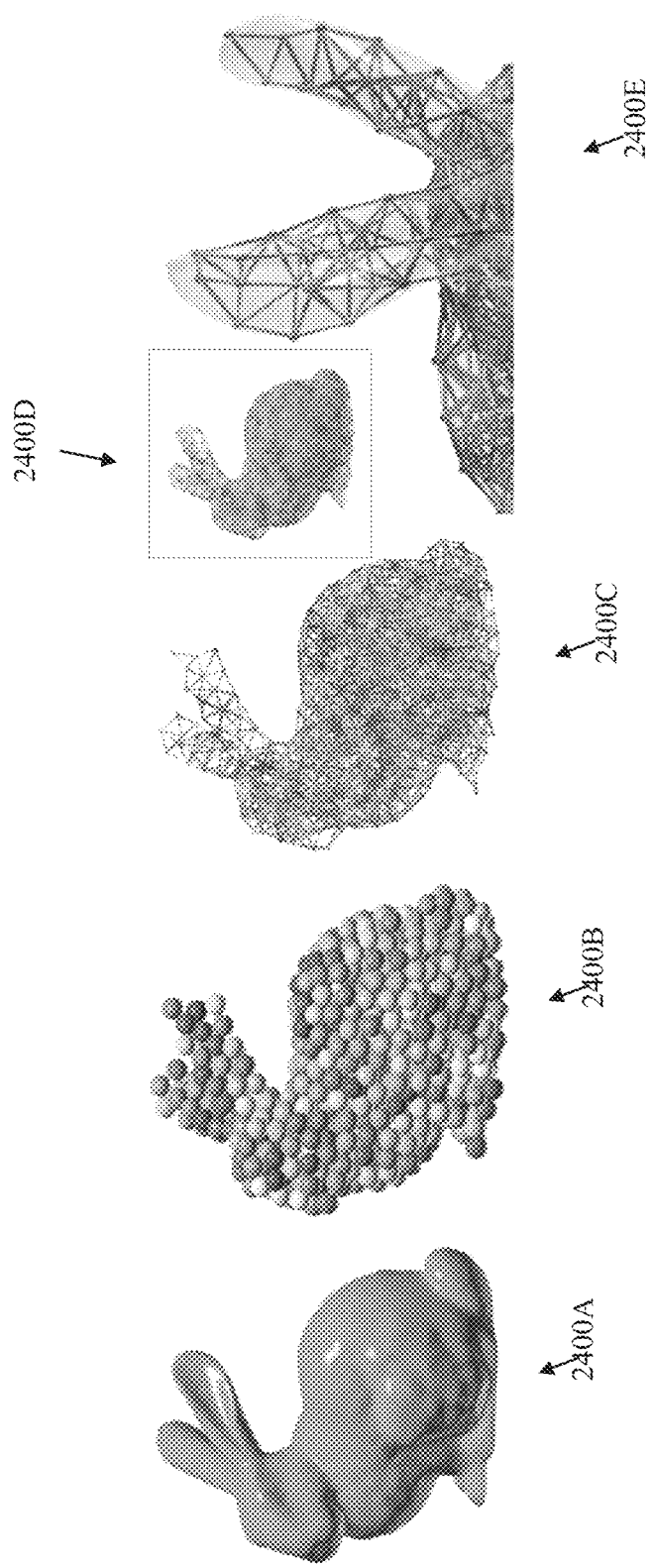
FIG. 23 is a schematic of an adapted Stanford bunny used as the 3D object representation for generating a truss by sphere packing, in accordance with some embodiments of the present invention.

Reference is now made to FIG. 23, which is a schematic of an adapted Stanford bunny used as the 3D object representation for generating a truss by sphere packing, in accordance with some embodiments of the present invention. The input model is shown by 2400A. The resulting packing is shown by 2400B and the associated truss lattice is shown by 2400C. The truss lattice, shown inside the translucent input model, is shown by 2400D. A zoomed-in view of the ears is shown by 2400E. The truss lattice manages to fit the complex geometry of the model at the ears.

It is noted that the bunny is a more challenging model than the duck, especially in finding a good sphere packing in narrow regions such as the ears. The truss structure, however, seems to be able to fit the geometry of the ears well, as shown in 2400E. The resulting truss lattice cannot preserve the fine surface details of the bunny. This would require using much smaller spheres, in the sphere packing process.

Figure 24:
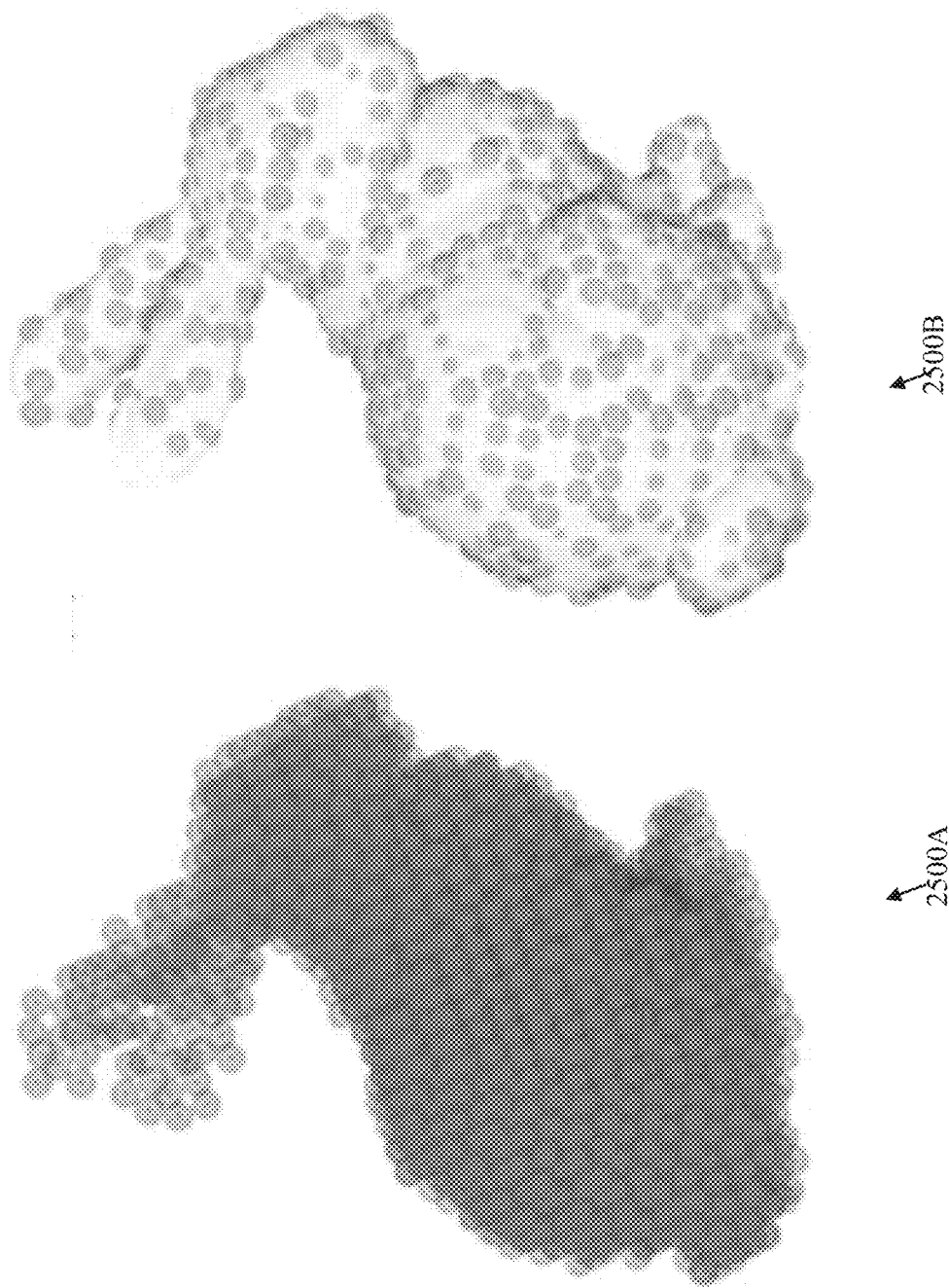
FIG. 24 is a schematic depicting an exemplary process of honeycomb (regular) packing of the adapted Stanford bunny, in accordance with some embodiments of the present invention.

Reference is now made to FIG. 24, which is a schematic depicting an exemplary process of honeycomb (regular) packing of the adapted Stanford bunny, in accordance with some embodiments of the present invention. The regular (honeycomb) spherical packing of 2805 spheres is shown by 2500A. Interior spheres that are closer than r=0.04 penetrate the boundary are shown by 2500B.

An additional model evaluated by Inventors is a mechanical polygonal model, with outward dimensions of 2.8×1.8× 0.4. This model does not have fine surface details, but its boundary is comprised of both smooth (approximately) curved surfaces and planar faces. To compute the model, Inventors used the exemplary sphere packing process using gravity shaking, with spheres of radius 0.06, resulting in 1086 spheres.

Figure 25:
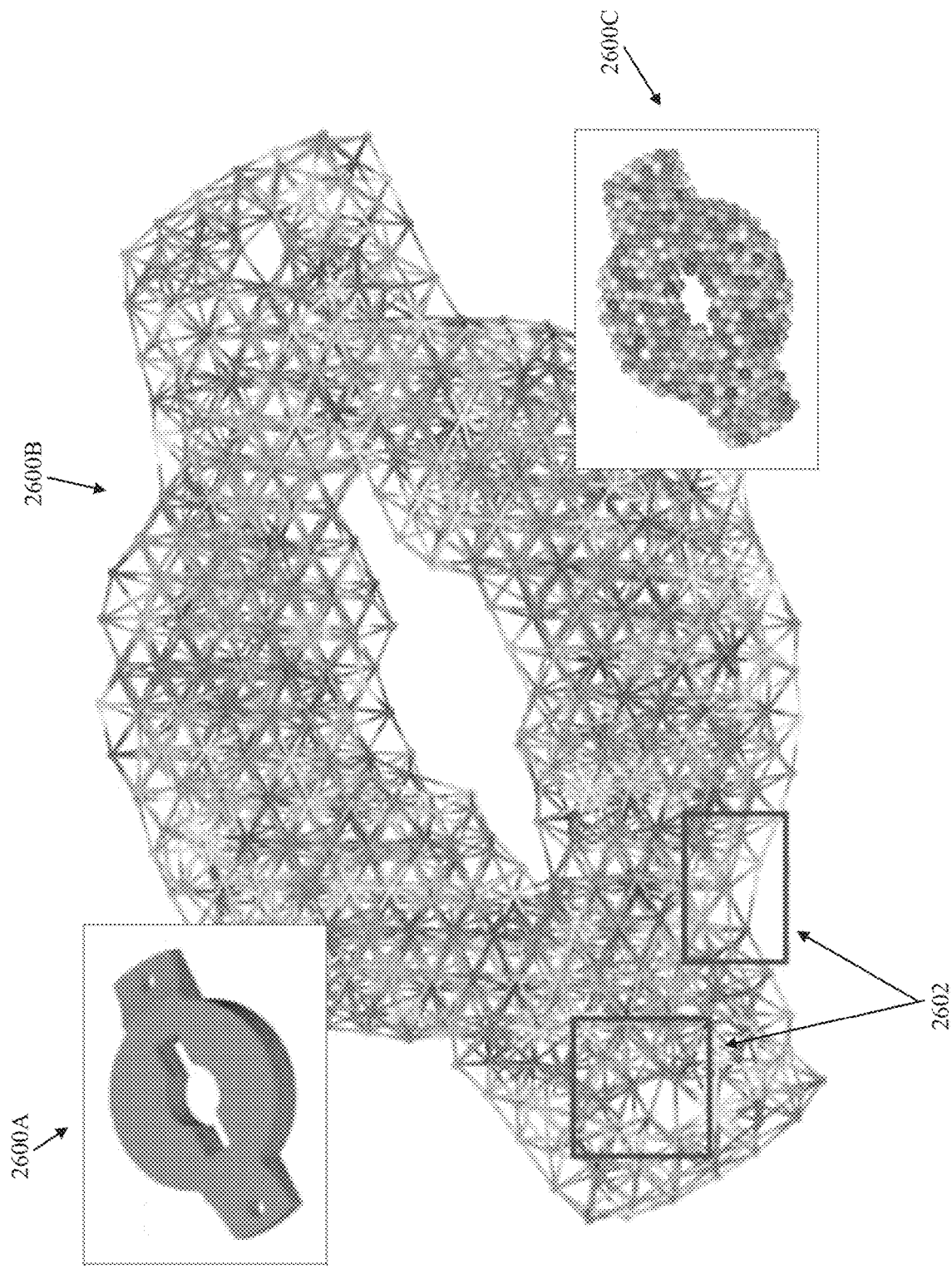
FIG. 25 is a schematic of a mechanical 3D object representation model for generating a lattice structure based on sphere packing, in accordance with some embodiments of the present invention.

Reference is now made to FIG. 25, which is a schematic of a mechanical 3D object representation model for generating a lattice structure based on sphere packing, in accordance with some embodiments of the present invention. The input CAD model is shown by 2600A. The resulting sphere packing is shown by 2600B, and the associated truss lattice is shown by 2600C.

Figure 26:
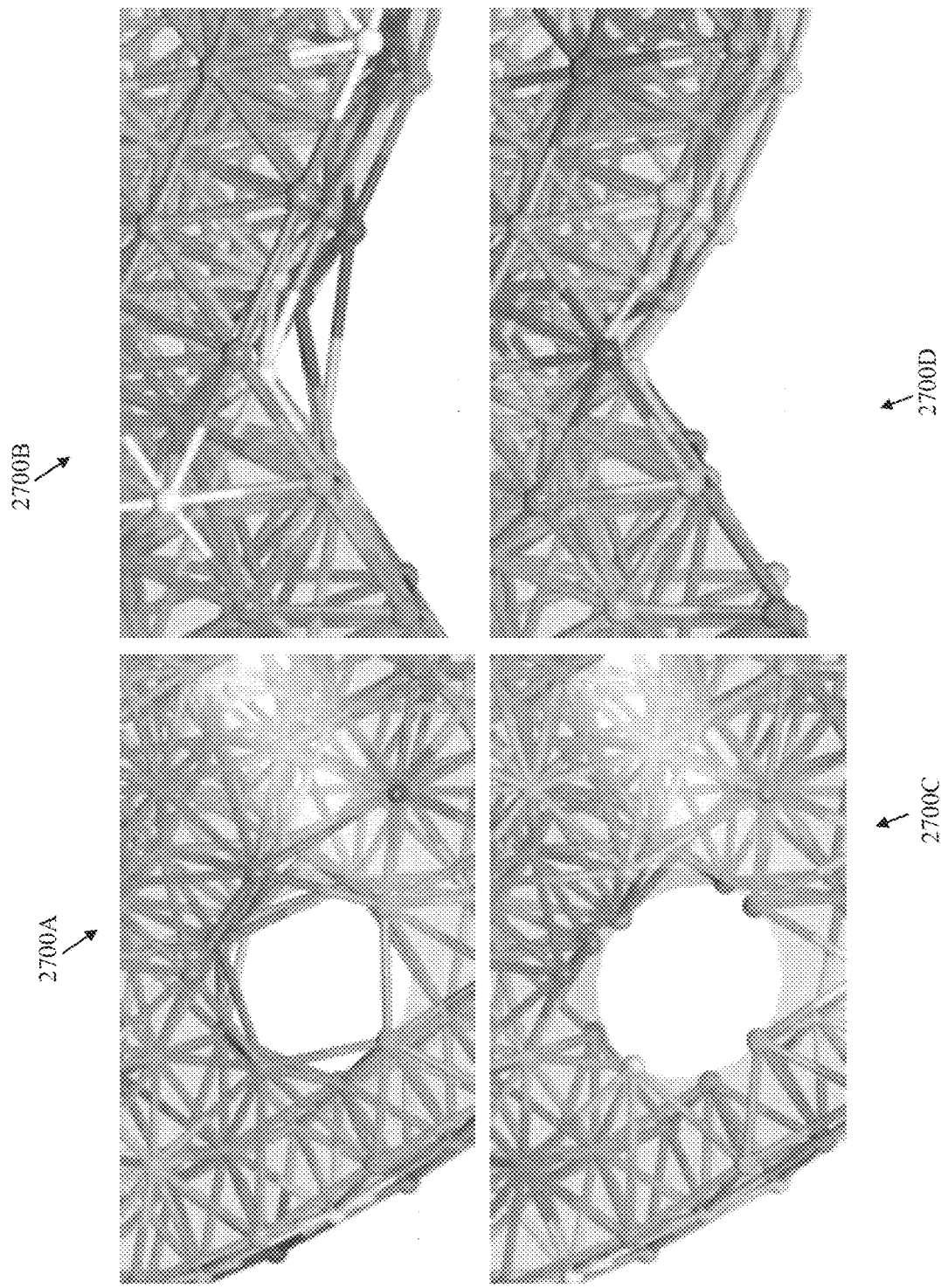
FIG. 26 is a schematic of Zoomed-in views of the truss lattice for the mechanical model of FIG. 25 that has cavities, in accordance with some embodiments of the present invention.

Reference is also made to FIG. 26, which is a schematic of Zoomed-in views of the truss lattice for the mechanical model of FIG. 25 that has cavities, in accordance with some embodiments of the present invention. 2700A and 2700B shown the lattice shown inside the (translucent) model, with the regions where the beams go outside the boundary marked in boxes 2602 of FIG. 25. The truss lattice after filtering out the beams that go outside the model's boundary is shown in 2700C and 2700D.

It is noted that in concave parts of the boundary, and especially near corners, some of the beams go outside the polygonal model. Assuming the mechanical model needs to fit into a space designed specifically for it, or alternatively, bolts needs to fit inside the bores (see 2700A and 2700B of FIG. 26), then these beams may cause the model to fail to fit correctly. To allow the user to address this issue, a feature may be provided with an option to delete the beams that go outside of the boundary of the model, see FIG. 26 2700C and 2700D, respectively.

Yet another model evaluated by Inventors present is a knot-shaped tube, with outward dimensions 1.9×0.8×1.9. The B-spline model has orders 4×4 with 10×43 control points.

Reference is now made to FIG. 27, which is a schematic of the knot-shaped tube 3D object representation model, in accordance with some embodiments of the present invention. The input B-spline model used for the 3D object representation is shown by 2800A. The computed sphere packing is shown by 2800B.

Similarly to the mechanical model (as described with reference to FIGS. 26-27), in the lattice that fills the knot-shaped tube there are beams that go outside the model, connecting far-apart regions. However, in particular applications that involve structural mechanics, these extra beams may be beneficial, as they could increase the structural strength of the structure.

Figure 28:
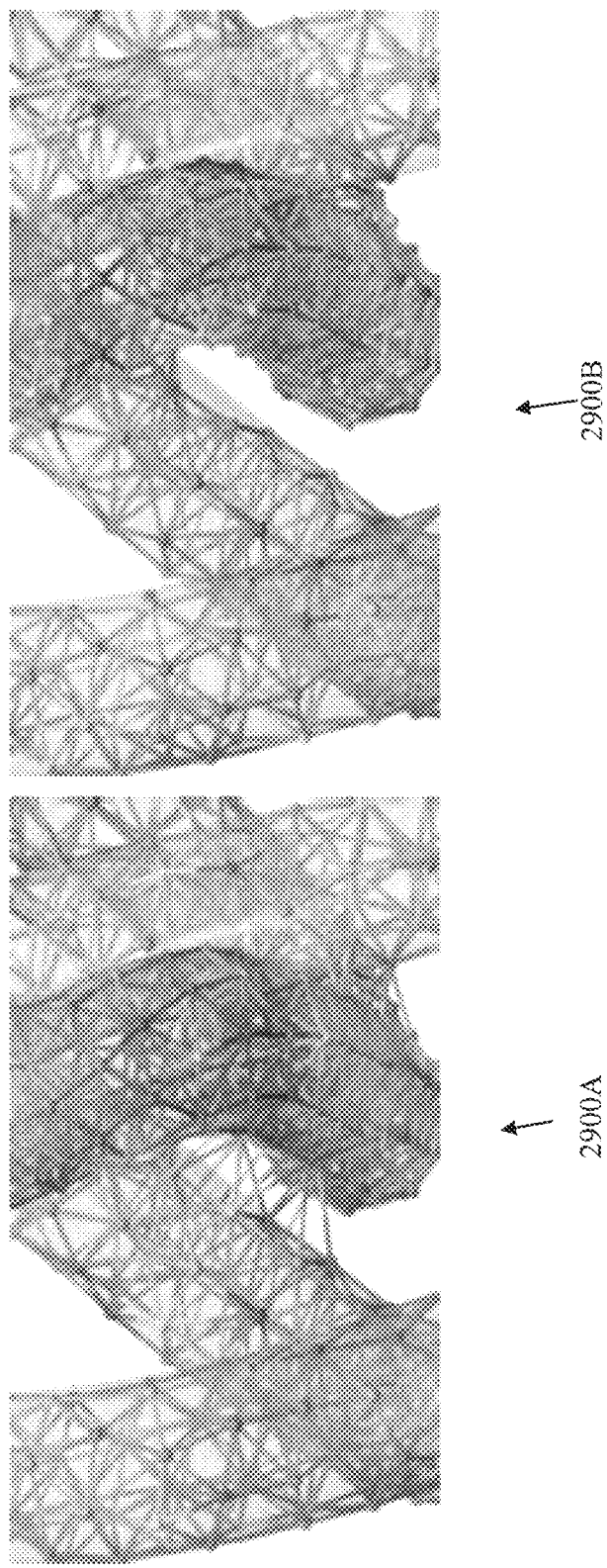
FIG. 28 is a schematic depicting zoomed-in views of the truss lattice for the knot-shaped tube of FIG. 27, in accordance with some embodiments of the present invention.

Reference is now made to FIG. 28, which is a schematic depicting zoomed-in views of the truss lattice for the knot-shaped tube of FIG. 27, in accordance with some embodiments of the present invention. The knot-shaped tube is depicted with and without beams that go outside the boundary of the model. At 2900A due to its complex geometry, the tube (translucent) contains regions where topologically different parts are close to each other, and therefore some lattice beams go outside the tube. At 2900B the truss lattice after a filtering process.

Inventors evaluated the feature of connecting the truss lattice to a shell of the model of the 3D object representation, as described herein. For the experiment, a sphere packing of the duck model described herein was used, in which all the spheres with their centers on the model boundary were removed.

Figure 29:
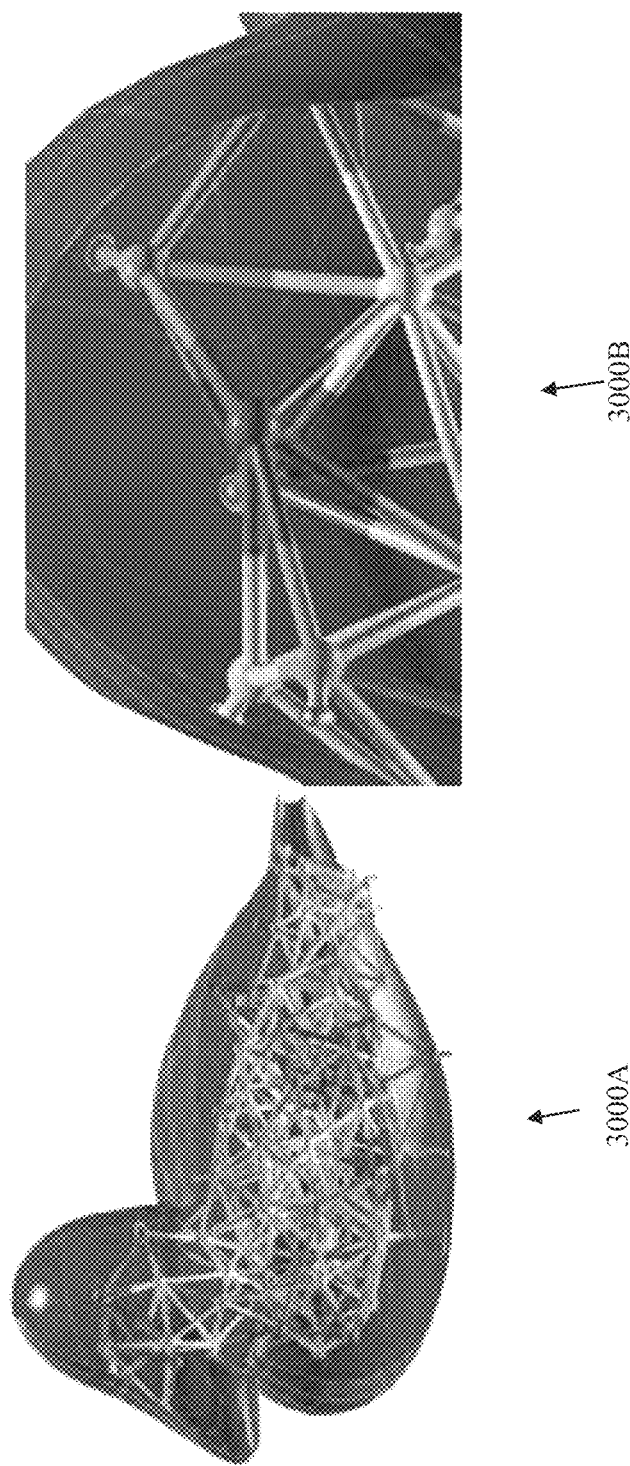
FIG. 29 is a schematic depicting a truss lattice connected to a shell of a 3D object representation of a duck, in accordance with some embodiment of the present invention.

Reference is now made to FIG. 29, which is a schematic depicting a truss lattice connected to a shell of a 3D object representation of a duck, in accordance with some embodiment of the present invention. Cut-out views of the results, showing half of the shell of the duck, are presented. At 3000A, a cut-out view of(a low resolution) truss lattice connected to (a half of) the duck surface model is shown. It is noted that some of the beams are connected to the half of the shell that is not displayed. At 3000B, a zoomed-in view of the duck's head is shown.

In yet another experiment, Inventors demonstrate a truss structure with non-uniform beam radius. Referring back to the exemplary process for constructing a single node, each half-beam can have a different radius denoted $r^{beam}$. Inventors created a very coarse sphere packing of the duck model (46 spheres), and assigned to each beam a radius proportional to the position of the corresponding beam along the duck, back to front. A structure with graded thickness was computed. Such a degree of freedom in the truss lattice structure may have advantages in, for example, structural mechanics.

Figure 30:
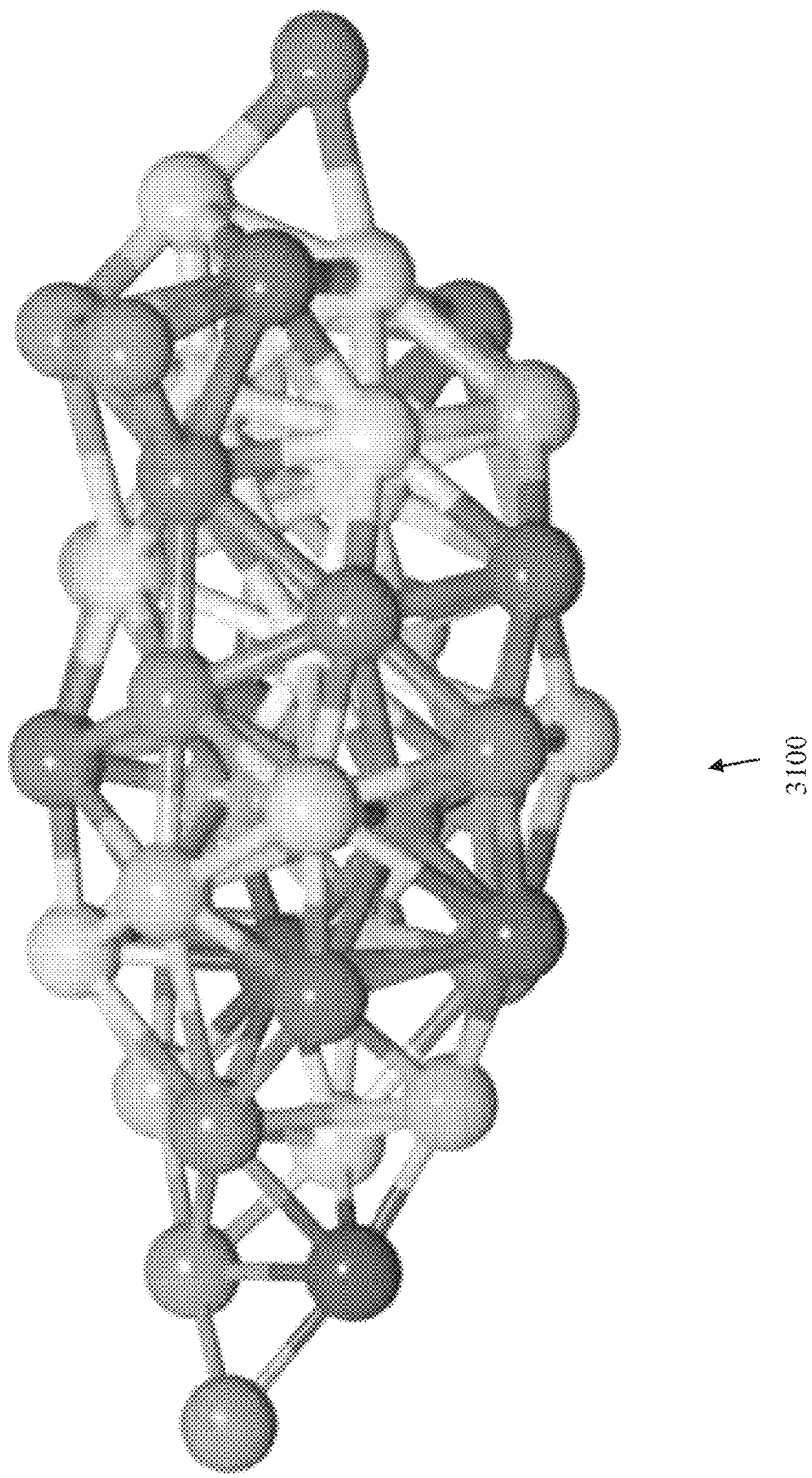
FIG. 30 is a schematic depicting a truss structure with beams of graded (non-uniform) thickness, from left (thin) to right (thick), globally, created using a very coarse sphere packing of the duck model, in accordance with some embodiments of the present invention.

Reference is now made to FIG. 30, which is a schematic depicting a truss structure 3100 with beams of graded (non-uniform) thickness, from left (thin) to right (thick), globally, created using a very coarse sphere packing of the duck model, in accordance with some embodiments of the present invention.

Another optional degree of freedom to control the physical properties of the lattice structure is the relative thickness of the node versus the beam. In the experiments described herein, the nodes of 2.5 times the thickness of the beams was used, in accordance with existing lattice systems, for example, as described with reference to SYMA systems, SYMA-orbit, the space-truss, https://www(dot)syma(dot)com/en/systems/inspiring-systems/syma-orbit.

Figure 31:
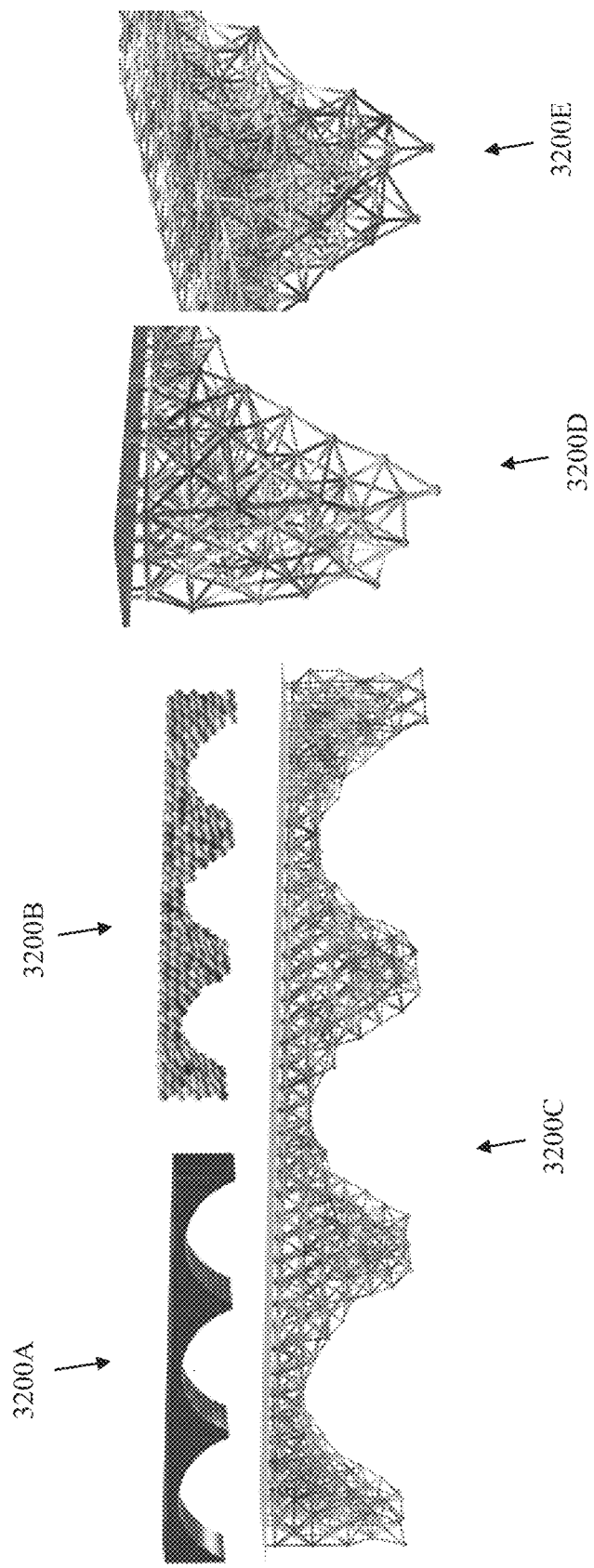
FIG. 31 is a schematic of 3D object representation of an arch bridge used to create a lattice structure, in accordance with some embodiments of the present invention.

In yet another experiment, the 3D object representation model is of a polygonal arch bridge with outward dimensions of 3×0.3×0.4. The road that is supported by the bridge structure is connected to the truss lattice by passing road surface as a partial shell surface to the exemplary process described herein for connecting the lattice to a shell. The results are presented in FIG. 31. In FIG. 31, an alternative solution is depicted where a truss lattice is constructed from a honeycomb sphere arrangement. The resulting truss lattice is clearly more regular.

Reference is now made to FIG. 31, which is a schematic of 3D object representation of an arch bridge used to create a lattice structure, in accordance with some embodiments of the present invention. The polygonal input model is shown by 3200A. The optimal sphere packing is shown by 3200B and the truss lattice constructed from it as shown by 3200C. A zoom-in of the optimal, yet irregular, lattice is shown by 3200D. In contrast, the truss lattice constructed from the regular (honeycomb) sphere arrangement is shown by 3200E.

An ideal sphere packing results in a lattice of fcc or hcp cells, which have properties that are desirable in many engineering applications, but is not always possible inside a boundary model of general shape. To evaluate the truss lattices produced by at least some implementations of the systems, methods, apparatus, and/or code instructions described herein, Inventors conducted a quantitative and qualitative analysis of some of the results. The connectivity of the truss lattice is dictated by the sphere packing, and by the parameter $d^{connect}$. In fcc and hcp lattices, (only) spheres in tangential contact with each other are connected by beams, forming tetrahedrons. Therefore, the lengths of all beams are 2r, where r denotes the radius of the spheres in the packing, and the acute angles between them are all equal to 60 degrees. In at least some implementations of the systems, methods, apparatus, and/or code instructions described herein, the user is able to control the maximum distance between the centers of the spheres that will be connected, by adjusting the value of $d^{connect}$. A truss lattice that forms an fcc or hcp lattice in the interior of the 3D object representation is considered, but also conforms to its shape near the boundary, to be the desirable result. It is expected that a denser sphere packing with smaller spheres will better approximate the ideal result.

Figure 32:
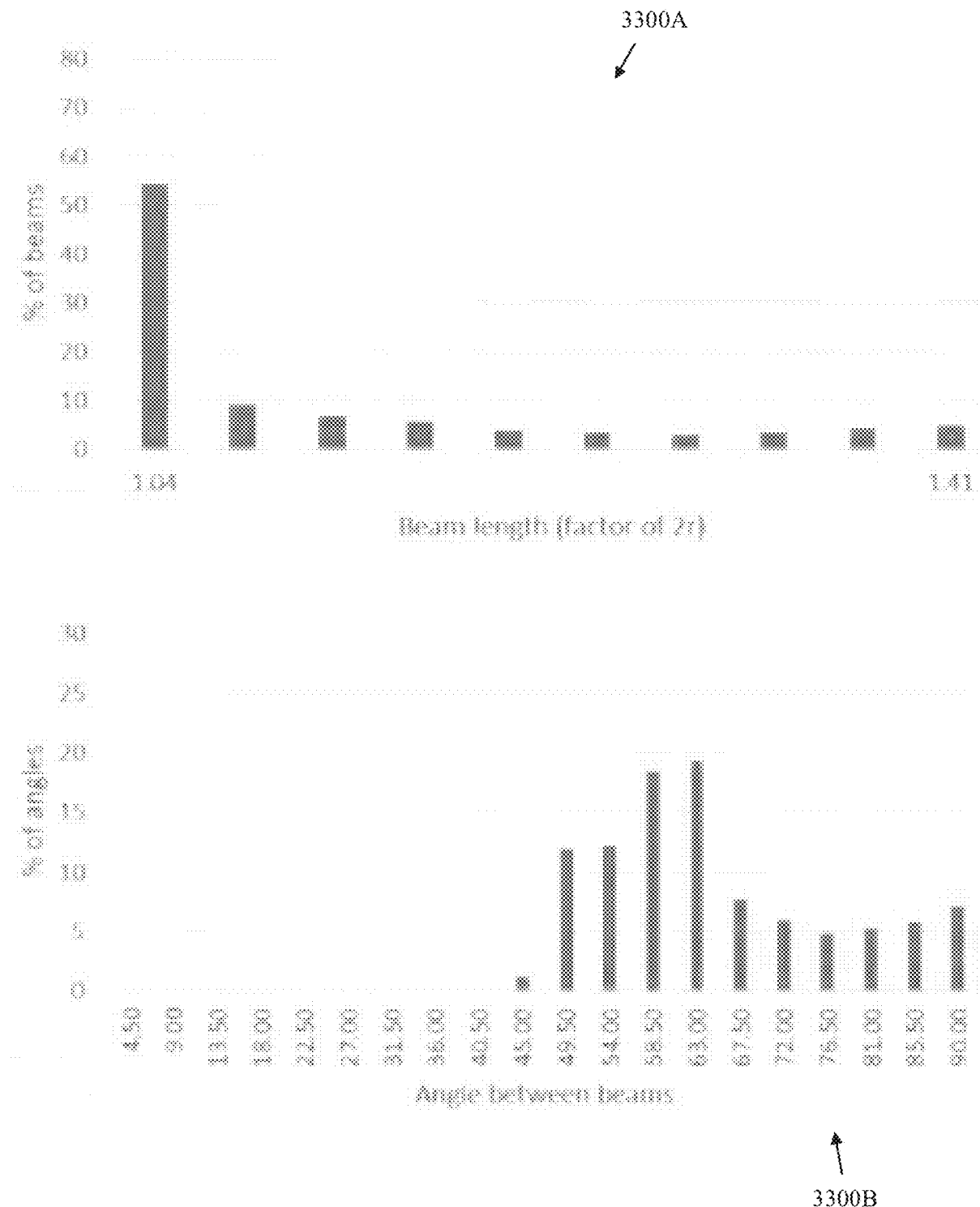
FIG. 32 includes graphs comparing the lengths and angles of the duck model packed with spheres with r=0.09 (vs. the duck packed with spheres with r=0.05, in accordance with some embodiments of the present invention.

Reference is now made to FIG. 32, which includes graphs comparing the lengths and angles of the duck model packed with spheres with r=0.09 (as shown in 2300B of FIG. 22), vs. the duck packed with spheres with r=0.05 (as shown in 2300D of FIG. 22), in accordance with some embodiments of the present invention. The comparison shows that using smaller spheres in the sphere packing leads to more cases with (close to) 60 degree angles between beams, which suggests more tetrahedral structures. The graphs compare the distributions of the beam lengths and acute angles between beams. The beam lengths are divided into ten buckets spanning the range [2r, $d^{connect}$]. The beam lengths of graph 3300A and angles of graph 3300B(b) of the duck model with r=0.09. The beam lengths of graph 3300C and angles of graph 3300D of the duck model with r=0.05

Figure 33:
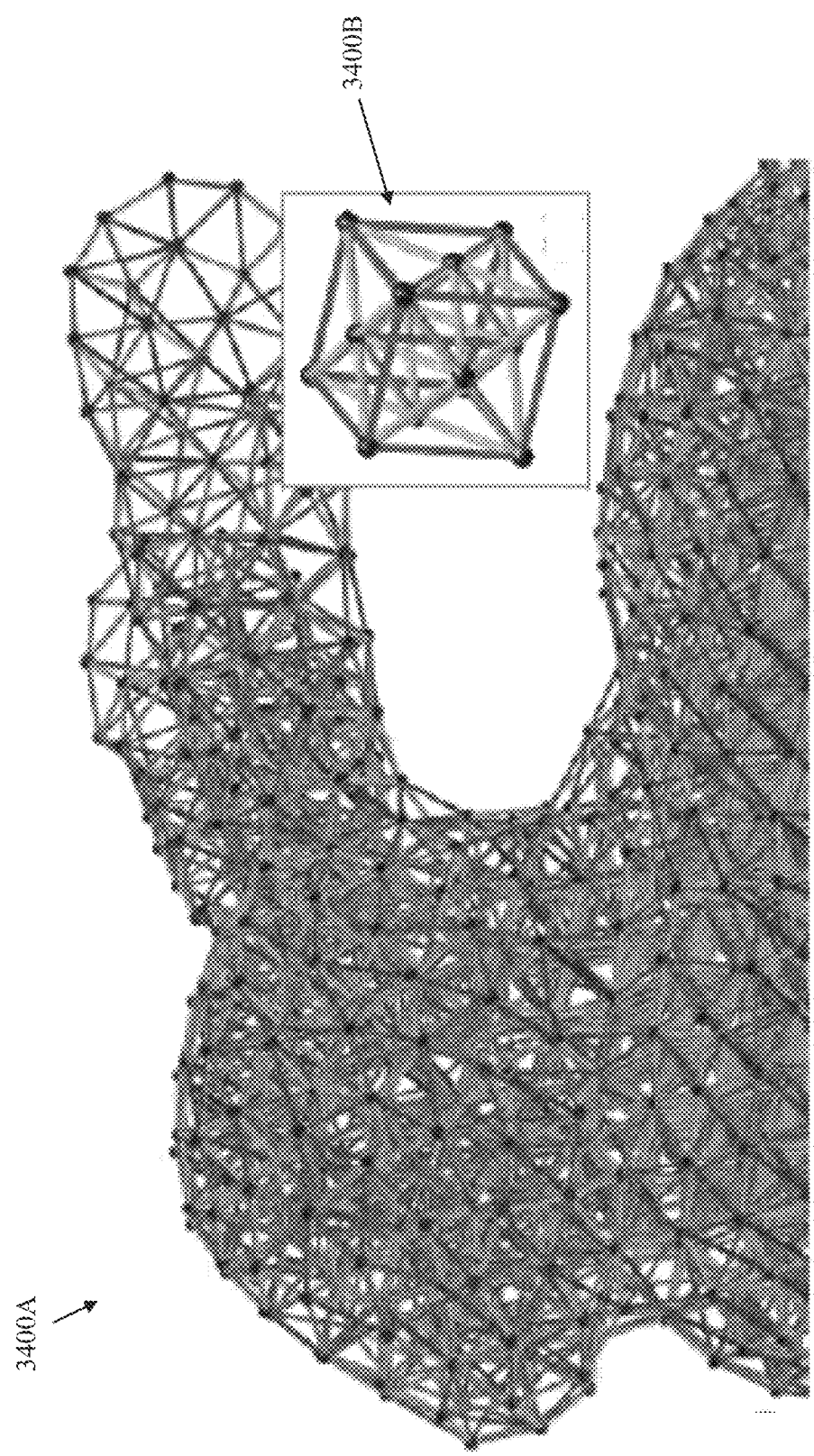
FIG. 33 is a schematic that visually validates the quality of the lattice produced by at least some of the processes described herein, in accordance with some embodiments of the present invention.

Reference is now made to FIG. 33, which is a schematic that visually validates the quality of the lattice produced by the at least some of the processes described herein, in accordance with some embodiments of the present invention. In FIG. 33, the bunny model (from FIG. 23) is compared with the beams colored according to their actual lengths. This example shows that at least some implementations of the systems, methods, apparatus, and/or code instructions described herein do indeed construct a regular tetrahedral truss lattice in the interior of the model (the bottom of the image in 3400A), while also fitting its boundary.

In 3400A, the truss lattice constructed from the adapted Stanford bunny, with the beams colored according to their length. Green beams correspond to the first bucket of the histogram (the first tenth of the range [2r, $d^{connect}$]), the red beams correspond to the last bucket, and the orange beams correspond to all other lengths. Note that since we used $d^{connect}=2r\sqrt{2}$, extra beams (red) are added to the tetrahedral lattice, as in 3400B the example octet cell. The distributions of the beam lengths 3400C and acute angles between beams 3400D.

To compare two sphere packing processes described herein, i.e., randomization and repulsion and gravity shaking, Inventors measured the number of packed spheres, starting from the same honeycomb arrangement. Inventors performed all measurements using an 8-thread Core i7 7700K CPU.

Figure 34:
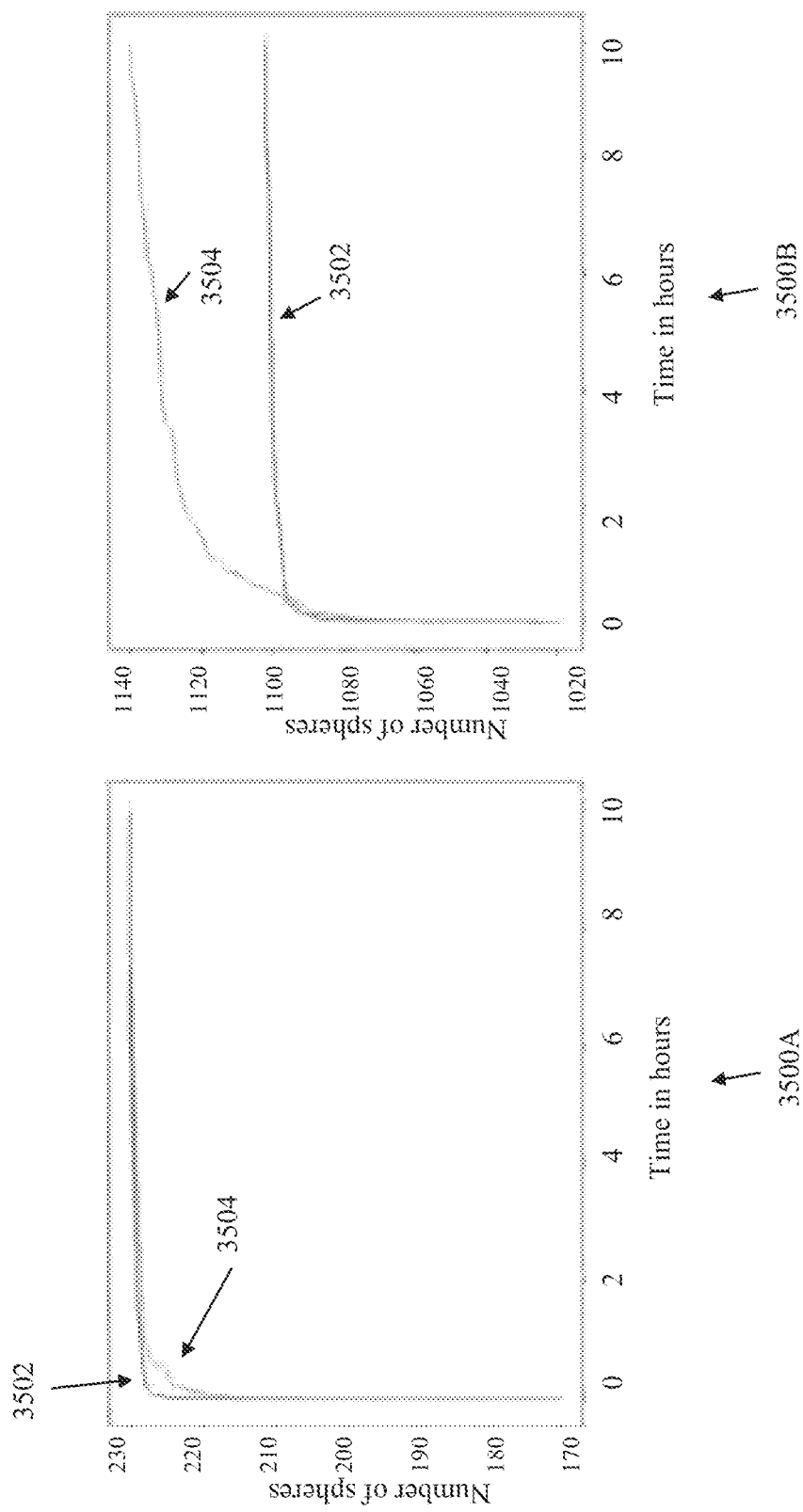
FIG. 34 includes graphs comparing the number of spheres packed by the randomization and repulsion process, versus the gravity shaking process, for the duck model over 10 hours, in accordance with some embodiments of the present invention.

Reference is now made to FIG. 34, which includes graphs comparing the number of spheres packed by the randomization and repulsion process 3502, versus the gravity shaking process 3504, for the duck model over 10 hours, in accordance with some embodiments of the present invention. Graph 3500A is for r=0.09. Graph 3500B is for r=0.04. FIG. 34 shows that there is no clear winner between the two sphere packing processes, in the general case. The randomization and repulsion process (shown in line 3502 in FIG. 34) is clearly superior in case shown by graph 3500A, where the potential number of spheres is low, especially in the short run. On the other hand, when more spheres are allowed by reducing the sphere radius, the gravity shaking process (shown in line 3504) performs comparably in the short run and noticeably outperforms the randomization and repulsion process, if given enough time to run. However, most cases evaluated herein included 1000-2000 spheres and executed each sphere packing algorithm for around 10 hours. In these particular cases, the gravity shaking process happened to always produce better final results.

The exemplary sphere packing processes described herein support both polygonal and freeform surface boundaries. However, in the examples evaluated herein, using freeform boundaries ended up being two to three levels of magnitude slower than their polygonal counterparts. Considering all these observations, in the result summary provided in Table 3600 of FIG. 34, the focus was on the results achieved with the gravity shaking on polygonal models.

Reference is now made to FIG. 35, which includes table 3600, which presents statistics on the sphere packing and truss lattice construction for various models, in accordance with some embodiments of the present invention. In the top row, BB states for the "bounding box", and the columns, in turn, show the sphere radii, algorithm applied, number of initial and optimized spheres, number of trimmed surfaces and trivariates, and finally computational times of truss and trivariate construction. In the Algor. column, RBM indicates rigid body motion, GS indicates gravity shaking, and RR indicates randomization and repulsion.

The generated truss lattice may be used in one or more applications.

The generated truss may be manufactured, for example, by additive manufacturing processes, such as when the beams and/or nodes are small. In another example, the generated truss may be manufactured by mass manufacturing of multiple nodes and beams of uniform size and shape, and providing instructions for assembly thereof, such as when the beams and/or nodes are large such as for construction of a bridge.

In another example, Isogeometric testing. At least some implementations described herein are designed for converting the truss lattice to a trivariate model such that the generated parameterizations are (isogeometric) analysis-compatible. Analyzing the truss structures computed by at least some implementations described herein, for example, for principal stress analysis, may provide valuable insights on the properties of truss structures that result from sphere packing, and compare their performance to structures designed by human engineers, or other processes.

Another potential application of using (isogeometric) analysis in conjunction with at least some implementations described herein is optimizing the parameters controlling the shape and size of the beams and the fillets, for example, in the context of stress analysis. This utilizes the ability to construct beams of different thickness, as described with reference to the Examples section below. An analysis-optimization loop for truss structures may be a powerful tool for engineering.

In yet another application of at least some implementations described herein, a trivariate representation of a model's shell may be constructed with the truss lattice connected thereto. As described herein, the geometry of the nodes and beams may be converted to tensor-product trivariate B-splines. A shell of arbitrary shape and joints to beams presents a technical challenge. The shell is to be partitioned into compatible components, that can form tensor product trivariates with a non-negative Jacobian, and choosing kernel points accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant 3D object representations will be developed and the scope of the term 3D object representations is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of manufacturing a truss of a three dimensional (3D) object representation, comprising:
   receiving a freeform boundary representation (b-rep) model of the 3D object representation;
   arranging within an interior space of the freeform b-rep model of the 3D object representation, a plurality of instances of a sphere having a common radius to create a packed sphere arrangement;
   computing nodes of a truss that conform to the freeform b-rep model of the 3D object representation, each respective node positioned at a center of each respective instance of each sphere of the packed sphere arrangement;

computing beams of the truss that conform to the freeform b-rep model by connecting adjacent nodes with respective beams, wherein the truss conforms to the freeform b-rep model; and manufacturing the truss that conforms to the freeform boundaries of the b-rep model.

2. The method of claim 1, wherein adjacent nodes spaced apart by a distance below a threshold are connected by a respective beam, and adjacent nodes spaced apart by a distance above the threshold are not connected by a respective beam.

3. The method of claim 1, wherein a set of three adjacent nodes form an angle defined by a first straight line defined by a first and second node and by a second straight line defined by the first and a third node, when the angle is equal to sixty degrees and within a tolerance range the set is connected by beams, and when the angle is external to the tolerance range the set is not connected by beams.

4. The method of claim 1, wherein the beams of the truss have a common length corresponding to the common radius of the plurality of instances of the sphere.

5. The method of claim 1, further comprising:
iterating the arranging and the computing for a plurality of iterations, wherein during each iteration at least one of the following values is adjusted to create an updated truss:
an adjusted value for the common radius of the plurality of instances of the sphere,
an adjusted value for a common size and/or shape for the nodes of the truss, and
an adjusted value for a common size and/or shape for the beams of the truss.

6. The method of claim 1, wherein a radius denoting thickness of each respective beam and/or node varies according to analysis and/or optimization, and/or location, of the respective beam within the 3D object representation.

7. The method of claim 1, wherein arranging comprises packing the plurality of instance of the sphere within the interior space of the 3D object representation by forming tangential contact between neighboring spheres.

8. The method of claim 1, wherein arranging comprises filling the interior space of the 3D object representation with spheres until no space remains therein large enough to accommodate an additional instance of the sphere.

9. The method of claim 1, wherein arranging comprises: positioning a uniformly sized honeycomb structure within the interior space of the 3D object representation, and placing each instance of the sphere within a respective honeycomb.

10. The method of claim 1, wherein arranging comprises:
randomly arranging the plurality of instances of the sphere within the interior space of the 3D object representation,
wherein at least some of the plurality of instances of the sphere overlap,
iteratively randomly perturbing the plurality of instance of the sphere, and
computing application of simulated repulsion forces between the plurality of instance of the sphere, wherein the simulated repulsion forces repulse spheres with sufficient simulated force for preventing overlap between instances of the sphere.

11. The method of claim 1, wherein arranging comprises:
computing a first arrangement of the plurality of instances of the sphere within the interior space of the 3D object representation, computing a simulation of an external attraction force vector applied in a direction externally to the 3D object representation that simulates attraction of the plurality of instance of the sphere of the first arrangement in the direction, and computing additional instances of the sphere that are placed in open spaces created by the simulation of the external attraction vector force applied to the first arrangement to create a second arrangement of the plurality of instances of the sphere.

12. The method of claim 1, wherein the interior space is enclosed by the freeform boundary representation model, and the truss is computed within the interior space enclosed by the freeform boundary representation model.

13. The method of claim 1, wherein the freeform boundary representation model denoted by the 3D object representation comprises an arbitrary, non-convex, free-form boundary, wherein the truss conforms to the arbitrary, non-convex, freeform b-rep model.

14. The method of claim 1, wherein the manufacturing device comprises an additive manufacturing device, and the code instructions are for additive manufacturing of the truss, or wherein the code instructions are for manufacturing of a set of beams having a common size and/or shape and a set of nodes having a common size and/or shape and instructions for assembling the set of beams and set of nodes into the truss.

15. The method of claim 1, further comprising:
computing a boundary shell for the 3D object representation, of controllable thickness,
wherein arranging comprises arranging within the interior space of the boundary shell,
computing nodes of the truss, each respective node positioned at a center of each respective instance of each sphere of the packed sphere arrangement,
computing beams of the truss by connecting adjacent nodes with respective beams, and
computing beams between nodes of the packed sphere arrangements that are closest to the inner surface of the boundary shell, and points on the inner surface of the boundary shell that are closest to each respective node closest to the inner surface of the boundary shell, thereby connecting the truss to the boundary shell.

16. The method of claim 1, wherein the 3D object representation is represented as B-spline surfaces' boundary further comprising:
computing nodes of the truss, each respective node positioned at a center of each respective instance of each sphere of the packed sphere arrangement,
computing beams of the truss by connecting adjacent nodes with respective beams,
computing a complete representation of a boundary surface of each node and a half of each beam connected to each node, by computing interior surfaces which separate each half of each beam from the respective node and from other beams and computing caps for each half of each beam,
wherein the boundary surfaces of the nodes and corresponding half of each beam of the truss are represented as trimmed B-spline surfaces, and further comprising
converting the boundary surfaces of the nodes and corresponding half of each beam of the truss to tensor-product B-spline surfaces.

17. The method of claim 16, further comprising:
computing B-spline trivariates by constructing ruled trivariates between the untrimmed surfaces that from each respective node and corresponding half of each beam and kernel points represented as degenerate surfaces, wherein for surfaces of the node the kernel point is represented as the center of the corresponding node, and for each half of each beam ruled trivariates are constructed between boundary surfaces that form the respective half of each beam include a base cap, a top cap and separating surface, wherein the kernel point is selected near the base cap.

18. The computer implemented method of claim 1, wherein the spheres arranged within an interior space of the b-rep model are non-overlapping.

19. The computer implemented method of claim 1, wherein computing beams comprises computing non-regular beams of the truss for conforming to a non-regular freeform model, wherein non-regular is selected from a group comprising: different lengths, different angles, and different number of beams per node.

20. The computer implemented method of claim 1, further comprising computing a shell according to the freeform model, connecting beams of the truss to the shell, and manufacturing the shell that includes the truss.

21. The computer implemented method of claim 1, wherein the freeform b-rep model is at least one of a trivariate parametric volume, and a trimmed trivariate parametric volume.

22. A system for manufacturing a truss of a three dimensional (3D) object representation, comprising:
   at least one hardware processor executing a code for:
      receiving a freeform b-rep model of the 3D object representation;
      arranging within an interior space of the freeform b-rep model of the 3D the 3D object representation, a plurality of instances of a sphere having a common radius to create a packed sphere arrangement;
      computing nodes of a truss that conform to the freeform b-rep model of the 3D object representation, each respective node positioned at a center of each respective instance of each sphere of the packed sphere arrangement;
      computing beams of the truss that conform to the freeform b-rep model by connecting adjacent nodes with respective beams,
      wherein the truss conforms to the freeform b-rep model; and manufacturing the truss that conforms to the freeform boundaries of the b-rep model.

23. A computer program product for manufacturing a truss of a three dimensional (3D) object representation, comprising:
   a non-transitory memory storing thereon code for execution by at least one hardware processor, the code including instructions for:
      receiving a freeform b-rep model of the 3D object representation;
      arranging within an interior space of the freeform b-rep model of the 3D object representation, a plurality of instances of a sphere having a common radius to create a packed sphere arrangement;
      computing nodes of a truss that conform to the freeform b-rep model of the 3D object representation, each respective node positioned at a center of each respective instance of each sphere of the packed sphere arrangement;
      computing beams of the truss that conform to the freeform b-rep model by connecting adjacent nodes with respective beams,
      wherein the truss conforms to the freeform b-rep model; and manufacturing the truss that conforms to the freeform boundaries of the b-rep model.

* * * * *